US012289578B2

(12) United States Patent
Zhou et al.

(10) Patent No.: US 12,289,578 B2
(45) Date of Patent: Apr. 29, 2025

(54) BONE CONDUCTION MICROPHONE

(71) Applicant: SHENZHEN SHOKZ CO., LTD., Guangdong (CN)

(72) Inventors: Wenbing Zhou, Shenzhen (CN); Yongshuai Yuan, Shenzhen (CN); Wenjun Deng, Shenzhen (CN); Xin Qi, Shenzhen (CN); Fengyun Liao, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 0 days.

(21) Appl. No.: 18/764,106

(22) Filed: Jul. 3, 2024

(65) Prior Publication Data

US 2024/0365058 A1 Oct. 31, 2024

Related U.S. Application Data

(63) Continuation of application No. 17/664,875, filed on May 25, 2022, now Pat. No. 12,114,129, which is a
(Continued)

(30) Foreign Application Priority Data

Jan. 17, 2020 (CN) ......................... 202010051694.7
Mar. 18, 2020 (WO) ................ PCT/CN2020/079809
Jul. 21, 2020 (WO) ................ PCT/CN2020/103201

(51) Int. Cl.
*H04R 1/46* (2006.01)
*H04R 1/08* (2006.01)
*H04R 1/28* (2006.01)

(52) U.S. Cl.
CPC ............... *H04R 1/46* (2013.01); *H04R 1/083* (2013.01); *H04R 1/2876* (2013.01); *H04R 2460/13* (2013.01)

(58) Field of Classification Search
CPC ........ H04R 1/46; H04R 1/083; H04R 1/2876; H04R 2460/13
(Continued)

(56) References Cited

U.S. PATENT DOCUMENTS 5,054,079 A 10/1991 Frielingsdorf et al.
5,805,726 A 9/1998 Yang et al.
(Continued)

FOREIGN PATENT DOCUMENTS

CN 2422781 Y 3/2001
CN 2428934 Y 5/2001
(Continued)

OTHER PUBLICATIONS

International Search Report in PCT/CN2020/142538 mailed on Mar. 18, 2021, 6 pages.
(Continued)

*Primary Examiner* — Sean H Nguyen
(74) *Attorney, Agent, or Firm* — METIS IP LLC

(57) ABSTRACT

A bone conduction microphone is provided. The bone conduction microphone may include a laminated structure formed by a vibration unit and an acoustic transducer unit. The bone conduction microphone may include a base structure configured to carry the laminated structure. At least one side of the laminated structure may be physically connected to the base structure. The base structure may vibrate based on an external vibration signal. The vibration unit may be deformed in response to the vibration of the base structure. The acoustic transducer unit may generate an electrical signal based on the deformation of the vibration unit. The bone conduction microphone may include at least one damping structural layer. The at least one damping structural layer may be arranged on an upper surface, a lower surface,
(Continued)

300 and/or an interior of the laminated structure, and the at least one damping layer may be connected to the base structure.

20 Claims, 27 Drawing Sheets

Related U.S. Application Data continuation of application No. PCT/CN2020/142538, filed on Dec. 31, 2020.

(58) Field of Classification Search
USPC .......................................................... 381/151
See application file for complete search history.

(56) References Cited

U.S. PATENT DOCUMENTS

| | | | |
|---|---|---|---|
| 6,693,849 | B1 | 2/2004 | Eberl et al. |
| 9,661,411 | B1 | 5/2017 | Han et al. |
| 10,078,097 | B2 | 9/2018 | Dubbeldeman et al. |
| 2003/0107302 | A1 | 6/2003 | Birth et al. |
| 2004/0081326 | A1 | 4/2004 | Michiels |
| 2005/0238188 | A1 | 10/2005 | Wilcox |
| 2007/0113649 | A1 | 5/2007 | Bharti et al. |
| 2008/0240482 | A1 | 10/2008 | Haddad et al. |
| 2011/0135123 | A1 | 6/2011 | Kim et al. |
| 2011/0319021 | A1 | 12/2011 | Proulx et al. |
| 2012/0148073 | A1 | 6/2012 | Kim et al. |
| 2012/0266686 | A1 | 10/2012 | Huffman |
| 2012/0267900 | A1 | 10/2012 | Huffman et al. |
| 2013/0310709 | A1 | 11/2013 | Ko et al. |
| 2018/0014123 | A1 | 1/2018 | Shajaan et al. |
| 2018/0184208 | A1 | 6/2018 | O'Brien et al. |

FOREIGN PATENT DOCUMENTS

| | | | |
|---|---|---|---|
| CN | 101646115 | A | 2/2010 |
| CN | 202310094 | U | 7/2012 |
| CN | 202551275 | U | 11/2012 |
| CN | 105101020 | A | 11/2015 |
| CN | 204836573 | U | 12/2015 |
| CN | 204887455 | U | 12/2015 |
| CN | 105101020 | B | 4/2017 |
| CN | 206620274 | U | 11/2017 |
| CN | 207732943 | U | 8/2018 |
| CN | 207765479 | U | 8/2018 |
| CN | 208987175 | U | 6/2019 |
| CN | 110475191 | A | 11/2019 |
| CN | 110602616 | A | 12/2019 |
| CN | 110603818 | A | 12/2019 |
| EP | 1665879 | B1 | 2/2007 |
| EP | 3125577 | A1 | 2/2017 |
| EP | 3573347 | A1 | 11/2019 |
| JP | H0256195 | A | 2/1990 |
| JP | H08195994 | A | 7/1996 |
| JP | H08195995 | A | 7/1996 |
| JP | 2002315095 | A | 10/2002 |
| JP | 2018137297 | A | 8/2018 |
| KR | 20060119972 | A | 11/2006 |
| KR | 20160015348 | A | 2/2016 |
| WO | 9407342 | A1 | 3/1994 |
| WO | 2011150394 | A1 | 12/2011 |

OTHER PUBLICATIONS

Written Opinion in PCT/CN2020/142538 mailed on Mar. 18, 2021, 8 pages.
International Search Report in PCT/CN2020/079809 mailed on Oct. 13, 2020, 4 pages.
Written Opinion in PCT/CN2020/079809 mailed on Oct. 13, 2020, 5 pages.
International Search Report in PCT/CN2020/103201 mailed on Sep. 24, 2020, 4 pages.
Written Opinion in PCT/CN2020/103201 mailed on Sep. 24, 2020, 5 pages.
The Extended European Search Report in European Application No. 20914747.9 mailed on Dec. 7, 2022, 11 pages.
First Office Action in Russian Application No. 2022114774 mailed on Mar. 20, 2023, 16 pages.
Notice of Reasons for Rejection in Japanese Application No. 2022-543562 mailed on Aug. 7, 2023, 9 pages.
Notice of Allowance in Japanese Application No. 2022-543562 mailed on Jan. 15, 2024, 6 pages.
Notice of Preliminary Rejection in Korean Application No. 10-2022-7023941 mailed on Jul. 31, 2024, 14 pages.

500

1000

1300

1500

1600

BONE CONDUCTION MICROPHONE

CROSS REFERENCE TO RELATED APPLICATIONS

This application is a Continuation of U.S. patent application Ser. No. 17/664,875 filed on May 25, 2022, which is a Continuation of International Application No. PCT/CN2020/142538 filed on Dec. 31, 2020, which claims priority of Chinese Patent Application No. 202010051694.7, filed on Jan. 17, 2020, International Application No. PCT/CN2020/079809 filed on Mar. 18, 2020, and International Application No. PCT/CN2020/103201 filed on Jul. 21, 2020, the entire contents of which are incorporated herein by reference.

TECHNICAL FIELD

The present disclosure relates to the technical field of sound transmission devices, and in particular, to a bone conduction microphone.

BACKGROUND

A microphone may receive an external vibration signal, use an acoustic transducer unit to convert the vibration signal into an electrical signal, and output the electrical signal after the electrical signal is processed by a back-end circuit. A high-performance microphone may have a relatively flat frequency response, which provides a sufficiently high signal-to-noise ratio. After the microphone receives the external vibration signal, the displacement of a vibration unit may generate the electrical signal. To make the frequency response be flat, a resonance frequency of the vibration unit is usually set to a relatively large value, which reduces the sensitivity or the signal-to-noise ratio of the microphone, and the call quality is poor. An effective way to improve the signal-to-noise ratio of the microphone is to adjust the resonance frequency to a voice frequency band. Due to a large Q value (small self-damping) of the vibration unit of the microphone, a high peak may appear at the resonance frequency of a frequency response curve, and too many signals may be picked up in a frequency band around a resonance peak when picking up a sound source signal. Therefore, signal distribution in a whole frequency band may be uneven, the definition may be low, and the signal may be distorted.

Therefore, it may be desirable to provide a bone conduction microphone to improve the performance of the microphone.

SUMMARY

One aspect of the present disclosure provides a bone conduction microphone. The bone conduction microphone may include a laminated structure formed by a vibration unit and an acoustic transducer unit. The bone conduction microphone may also include a base structure configured to carry the laminated structure, and at least one side of the laminated structure may be physically connected to the base structure. The base structure may vibrate based on an external vibration signal. The vibration unit may be deformed in response to the vibration of the base structure. The acoustic transducer unit may generate an electrical signal based on the deformation of the vibration unit. The bone conduction microphone may also include at least one damping structural layer. The at least one damping structural layer may be arranged on an upper surface, a lower surface, and/or an interior of the laminated structure, and connected to the base structure.

In some embodiments, a material of the at least one damping structural layer may include polyurethane, epoxy resin, acrylate, polyvinyl chloride, butyl rubber, or silicone rubber.

In some embodiments, a Young's modulus of the material of the at least one damping structural layer may be in a range of $10^6$ Pa~$10^{10}$ Pa.

In some embodiments, a density of the material of the at least one damping structural layer may be in a range of $0.7\times10^3$ kg/m$^3$~$2\times10^3$ kg/m$^3$.

In some embodiments, a Poisson's ratio of the material of the at least one damping structural layer may be in a range of 0.4~0.5.

In some embodiments, a thickness of the at least one damping structural layer may be in a range of 0.1 um~80 um.

In some embodiments, a thickness of the at least one damping structural layer may be in a range of 0.1 um~10 um.

In some embodiments, a thickness of the at least one damping structural layer may be in a range of 0.5 um~5 um.

In some embodiments, a loss factor of the at least one damping structural layer may be in a range of 1~20.

In some embodiments, a loss factor of the at least one damping structural layer may be in a range of 5~10.

In some embodiments, the base structure may include an inner-hollow frame structure. One end of the laminated structure may be connected to the base structure or the at least one damping structural layer, and the other end of the laminated structure may be suspended in a hollow position of the base structure.

In some embodiments, the vibration unit may include a suspended film structure. The acoustic transducer unit may include a first electrode layer, a piezoelectric layer, and a second electrode layer that are arranged in sequence from top to bottom. The suspended film structure may be connected with the base structure through a peripheral side of the suspended film structure, and the acoustic transducer unit may be arranged on an upper surface or a lower surface of the suspended film structure.

In some embodiments, the suspended film structure may include a plurality of holes, and the plurality of holes may be arranged along a circumference of the acoustic transducer unit.

In some embodiments, the vibration unit may further include a mass element, and the mass element may be arranged on the upper surface or the lower surface of the suspended film structure.

In some embodiments, the acoustic transducer unit and the mass element may be arranged on different sides of the suspended film structure, respectively.

In some embodiments, the acoustic transducer unit and the mass element may be arranged on the same side of the suspended film structure. The acoustic transducer unit may be a ring-shaped structure, and the ring-shaped structure may be arranged along a circumference of the mass element.

In some embodiments, the vibration unit may include at least one support arm and a mass element, and the mass element may be connected to the base structure via the at least one support arm.

In some embodiments, the acoustic transducer unit may be arranged on an upper surface, a lower surface, or an interior of the at least one support arm.

In some embodiments, the acoustic transducer unit may include a first electrode layer, a piezoelectric layer, and a second electrode layer that are arranged in sequence from top to bottom, and the first electrode layer or the second electrode layer may be connected to the upper surface or the lower surface of the at least one support arm.

In some embodiments, the mass element may be arranged on an upper surface or a lower surface of the first electrode layer or the second electrode layer.

In some embodiments, an area of the first electrode layer, the piezoelectric layer, and/or the second electrode layer may not be greater than an area of the support arm, and part or all of the first electrode layer, the piezoelectric layer, and/or the second electrode layer may cover the upper surface or the lower surface of the at least one support arm.

In some embodiments, the first electrode layer, the piezoelectric layer, and the second electrode layer of the acoustic transducer unit may be close to a connection between the mass element and/or the support arm and the base structure.

In some embodiments, the at least one support arm may include at least one elastic layer, and the at least one elastic layer may be arranged on an upper surface and/or a lower surface of a first electrode layer or a second electrode layer.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
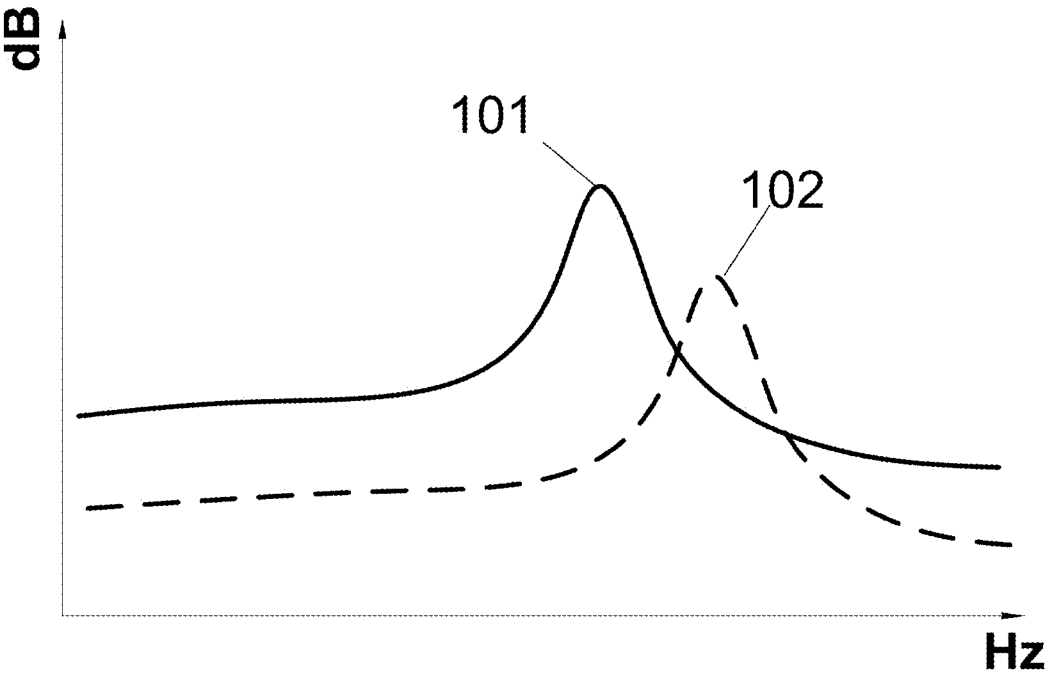
FIG. 1 is a frequency response curve of a laminated structure with a natural frequency moving forward according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation. It should be understood that the purposes of these illustrated embodiments are only provided to those skilled in the art to practice the application, and not intended to limit the scope of the present disclosure. It should be understood that the drawings are not drawn to scale.

It should be understood that in order to facilitate the description of the present disclosure, the terms “center”, “upper surface”, “lower surface”, “upper”, “lower”, “top”, “bottom”, “inside”, “outside”, “axial”, “radial”, “peripheral”, “external”, etc., are used to indicate a positional relationship, and the indicated positional relationship is based on the positional relationship shown in the drawings, rather than indicating that the indicated devices, components, or units may have a specific positional relationship, which is not intended to limit the scope of the present disclosure.

It will be understood that the terms “system,” “engine,” “unit,” “module,” and/or “block” used herein are one method to distinguish different components, elements, parts, sections, or assemblies of different levels in ascending order. However, the terms may be displaced by other expressions if they may achieve the same purpose.

As used in the disclosure and the appended claims, the singular forms “a,” “an,” and “the” include plural referents unless the content clearly dictates otherwise. In general, the terms “comprise” and “include” merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

The embodiments of the present disclosure provide a bone conduction microphone. The bone conduction microphone may include a base structure, a laminated structure, and at least one damping structural layer. In some embodiments, the base structure may be a regular or an irregular three-dimensional structure with a hollow part inside the base structure. For example, the base structure may be a hollow frame structure, including but not limited to a rectangular frame, a circular frame, a regular polygon frame, or other regular shapes, or any irregular shapes. The laminated structure may be arranged in the hollow part of the base structure, or at least partially suspended above the hollow part of the base structure. In some embodiments, at least part of the laminated structure may be physically connected to the base structure. The “connection” herein may be understood as that after the laminated structure and the base structure are prepared respectively, the laminated structure and the base structure may be fixedly connected with each other by welding, riveting, clamping, bolts, or the like, or in the preparation process, the laminated structure may be deposited on the base structure by means of physical deposition (e.g., physical vapor deposition) or chemical deposition (e.g., chemical vapor deposition). In some embodiments, the at least part of the laminated structure may be fixed to an upper surface or a lower surface of the base structure, and the at least part of the laminated structure may also be fixed to a sidewall of the base structure. For example, the laminated structure may be a cantilever beam. The cantilever beam may be a plate-shaped structure. One end of the cantilever beam may be connected with the upper surface, the lower surface of the base structure, or the sidewall where the hollow part of the base structure is located, and the other end of the cantilever beam may not be connected or in contact with the base structure, so that the other end of the cantilever beam may be suspended in the hollow part of the base structure. As another example, the bone conduction microphone may include a diaphragm layer (also called a suspended film structure). The suspended film structure may be fixedly connected with the base structure, and the laminated structure may be arranged on an upper surface or a lower surface of the suspended film structure. As another example, the laminated structure may include a mass element and one or more support arms. The mass element may be fixedly connected to the base structure via the one or more support arms. One end of the support arm may be connected to the base structure, and the other end of the support arm may be connected to the mass element, so that part of the areas of the mass element and the support arm may be suspended in the hollow part of the base structure. It should be noted that the terms “arranged in the hollow part of the base structure” or “suspended in the hollow part of the base structure” in the present disclosure may refer to being suspended inside, below, or above the hollow part of the base structure. In some embodiments, the laminated structure may include a vibration unit and an acoustic transducer unit. Specifically, the base structure may vibrate based on an external vibration signal, and the vibration unit may be deformed in response to the vibration of the base structure. The acoustic transducer unit may generate an electrical signal based on the deformation of the vibration unit. It should be understood that the description of the vibration unit and the acoustic transducer unit herein may be only for the purpose of conveniently illustrating the working principles of the laminated structure, and not intended to limit the actual composition and the structure of the laminated structure. Actually, the vibration unit may not be necessary, and the function of the vibration unit may be completely realized by the acoustic transducer unit. For example, after making certain changes to the structure of the acoustic transducer unit, the acoustic transducer unit may directly respond to the vibration of the base structure to generate the electrical signal.

The vibration unit may refer to the part of the laminated structure that is easily deformed by an external force. The vibration unit may be used to transmit the deformation caused by the external force to the acoustic transducer unit. In some embodiments, the vibration unit and the acoustic transducer unit may overlap with each other to form the laminated structure. The acoustic transducer unit may be arranged on an upper layer of the vibration unit, or a lower layer of the vibration unit. For example, when the laminated structure is a cantilever beam structure, the vibration unit may include at least one elastic layer. The acoustic transducer unit may include a first electrode layer, a piezoelectric layer, and a second electrode layer that are arranged in sequence from top to bottom. The elastic layer may be arranged on the surface of the first electrode layer or the second electrode layer. The elastic layer may deform during vibration, the piezoelectric layer may generate the electrical signal based on the deformation of the elastic layer, and the first electrode layer and the second electrode layer may collect the electrical signal. As another example, the vibration unit may also be the suspended film structure, which may be obtained by changing the density of a specific area of the suspended film structure, punching holes on the suspended film structure, or arranging a weight block (also called a mass element) on the suspended film structure, or the like, so that the suspended film structure close to the acoustic transducer unit may be more easily deformed under the action of the external force, thereby driving the acoustic transducer unit to generate the electrical signal. As another example, the vibration unit may include at least one support arm and the mass element. The mass element may be suspended in the hollow part of the base structure via the support arm. When the base structure vibrates, the support arm and the mass element of the vibration unit may move relative to the base structure, and the support arm may deform and act on the acoustic transducer unit to generate the electrical signal.

The acoustic transducer unit may refer to the part of the laminated structure that converts the deformation of the vibration unit into the electrical signal. In some embodiments, the acoustic transducer unit may include at least two electrode layers (e.g., a first electrode layer and a second electrode layer). The piezoelectric layer may be arranged between the first electrode layer and the second electrode layer. The piezoelectric layer may refer to a structure that may generate a voltage on two ends of the piezoelectric layer when the piezoelectric layer is subjected to the external force. In some embodiments, the piezoelectric layer may be a piezoelectric polymer film obtained by a deposition process of semiconductors (e.g., magnetron sputtering, MOCVD). In the embodiments of the present disclosure, the piezoelectric layer may generate a voltage under the action of the deformation of the vibration unit, and the first electrode layer and the second electrode layer may collect the voltage (the electrical signal). In some embodiments, the material of the piezoelectric layer may include piezoelectric crystal material and piezoelectric ceramic material. The piezoelectric crystal may refer to a piezoelectric single crystal. In some embodiments, the piezoelectric crystal material may include crystal, sphalerite, boracite, tourmaline, zincite, GaAs, barium titanate, and the derivative structure crystals of the barium titanate, $KH_2PO_4$, $NaKC_4H_4O_6 \cdot 4H_2O$ (Rochelle salt), or the like, or any combination thereof. The piezoelectric ceramic material may refer to piezoelectric polycrystals formed by a random collection of fine crystal grains obtained by solid-phase reaction and sintering between powders of different materials. In some embodiments, the piezoelectric ceramic material may include barium titanate (BT), lead zirconate titanate (PZT), lead barium lithium niobate (PBLN), modified lead titanate (PT), aluminum nitride (AlN)), zinc oxide (ZnO), or the like, or any combination thereof. In some embodiments, the piezoelectric layer material may also be a piezoelectric polymer material, such as polyvinylidene fluoride (PVDF), or the like.

The damping structural layer may refer to a structure with damping properties. In some embodiments, the damping structural layer may be a film-shaped structure or a plate-shaped structure. Further, at least one side of the damping structural layer may be connected to the base structure. In some embodiments, the damping structural layer may be arranged between the upper surface and/or the lower surface of the laminated structure or between the multi-layered layered structures of the laminated structure. For example, when the laminated structure is the cantilever beam, the damping structural layer may be arranged on an upper surface and/or a lower surface of the cantilever beam. As another example, when the laminated structure is the support arm and the mass element, and the mass element protrudes downward relative to the support arm, the damping structural layer may be arranged on a lower surface of the mass element and/or an upper surface of the support arm. In some embodiments, for a macro-sized laminated structure and a base structure, the damping structural layer may be directly bonded at the base structure or the laminated structure. In some embodiments, for MEMS devices, semiconductor processes may be utilized, for example, evaporation, spin coating, micro-assembly, or the like, to make the damping structural layer be connected to the laminated structure and the base structure. In some embodiments, the shape of the damping structural layer may be a regular shape such as a circle, an ellipse, a triangle, a quadrangle, a hexagon, an octagon, or the like. In some embodiments, an output effect of the electrical signal of the bone conduction microphone may be improved by selecting the material, size, thickness, or the like, of the damping structural layer. Details may refer to the related descriptions in the present disclosure.

In some embodiments, the base structure and the laminated structure may be arranged in a housing of the bone conduction microphone. The base structure may be fixedly connected with an inner wall of the housing, and the laminated structure may be carried on the base structure. When the housing of the bone conduction microphone vibrates due to an external force (e.g., the vibration of the face may drive the housing to vibrate when a person is talking), the vibration of the housing may drive the base structure to vibrate. Due to the different properties of the laminated structure and the housing structure (or the base structure), a completely consistent movement between the laminated structure and the housing may not be kept, thereby generating a relative motion, and the vibration unit of the laminated structure may be deformed. Further, when the vibration unit is deformed, the piezoelectric layer of the acoustic transducer unit may be subjected to deformation stress of the vibration unit to generate a potential difference (voltage). At least two electrode layers (e.g., the first electrode layer and the second electrode layer) arranged on the upper surface and the lower surface of the piezoelectric layer in the acoustic transducer unit may collect the potential difference so as to convert the external vibration signal into the electrical signal. Damping of the damping structural layer may be different under different stress (deformation) states. For example, relatively great damping may be present at high stress or a large amplitude. Therefore, the characteristics of the laminated structure with a small amplitude in a non-resonance area and a large amplitude in a resonance area may be used. By adding a damping structural layer, a Q value of the resonance area may be reduced while ensuring that the sensitivity of the bone conduction microphone in the non-resonance area is not reduced, so that the frequency response of a bone conduction sound transmission device may be relatively flat in an entire frequency range. For illustrative purposes only, the bone conduction microphone described in the embodiments of the present disclosure may be applied to earphones (e.g., bone conduction earphones or air conduction earphones), glasses, a virtual reality device, a helmet, or the like. The bone conduction microphone may be placed on the head (e.g., the face), the neck, close to the ears, or on the top of the head, or the like. The bone conduction microphone may pick up the vibration signal of the bones when a person is talking, and convert the vibration signal into the electrical signal to realize the acquisition of sound. It should be noted that the base structure may not be limited to a structure independent of the housing of the bone conduction microphone. In some embodiments, the base structure may also be part of the housing of the bone conduction microphone.

The laminated structure may have a natural frequency. When the frequency of the external vibration signal is close to the natural frequency, the laminated structure may generate a larger amplitude, thereby outputting a larger electrical signal. Therefore, the frequency response of the bone conduction microphone to the external vibration may be that a resonance peak may be generated near the natural frequency. In some embodiments, by changing parameters of the laminated structure, the natural frequency of the laminated structure may be changed to the voice frequency range, and the resonance peak of the bone conduction microphone may be located in the voice frequency range, thereby improving the sensitivity of the bone conduction microphone to respond to vibrations in the voice frequency range (e.g., the frequency range before the resonance peak). As shown in FIG. 1, the frequency corresponding to the resonance peak 101 in the frequency response curve (the solid curve shown in FIG. 1) in which the natural frequency of the laminated structure moves forward may be smaller than the frequency corresponding to the resonance peak 102 in the frequency response curve (the dashed curve shown in FIG. 1) in which the natural frequency of the laminated structure is unchanged. For an external vibration signal with a frequency that is lower than the frequency at which the resonance peak 101 is located, the bone conduction microphone corresponding to the solid curve may have higher sensitivity.

An equation for the displacement of the laminated structure may be as follows:

$$x_a = \frac{F}{\omega|Z|} = \frac{F}{\omega\sqrt{R^2 + \left(\omega M - K\omega^{-1}\right)^2}}, \quad (1)$$

wherein F refers to an amplitude of an exciting force, R refers to damping of the laminated structure, M refers to mass of the laminated structure, K refers to an elastic coefficient of the laminated structure, $x_a$ refers to a displacement of the laminated structure, w refers to a circular frequency of an external force, and $\omega_0$ refers to a natural frequency of the laminated structure. When the frequency of the exciting force (i.e., the external vibration) satisfies $$\omega < \omega_0\left(\omega_0 = \sqrt{\frac{K}{M}}\right),$$

$\omega M < K\omega^{-1}$. If the natural frequency $\omega_0$ of the laminated structure is reduced (by increasing M or decreasing K, or increasing M and decreasing K simultaneously), then $|\omega M < K\omega^{-1}|$ may decrease, and the corresponding output displacement $x_a$ may increase. When the frequency of the exciting force satisfies $\omega = \omega_0$, $\omega M = K\omega^{-1}$, and the output displacement $x_a$ may be unchanged when the natural frequency $\omega_0$ of the vibration-electrical signal conversion device (the laminated structure) changes. When the frequency of the exciting force satisfies $w > \omega_0$, $\omega M > K\omega^{-1}$. If the natural frequency $\omega_0$ of the vibration-electrical signal conversion device is decreased (by increasing M or decreasing K or increasing M and decreasing K simultaneously), $|\omega M - K\omega^{-1}|$ may increase and the corresponding output displacement $x_a$ may decrease.

As the resonance peak moves forward, a peak value may appear in the voice frequency band. When the bone conduction microphone picks up the signal, too many signals may be in the resonance peak frequency band, which makes the call effect be poor. In some embodiments, in order to improve the quality of the sound signal collected by the bone conduction microphone, the damping structural layer may be arranged in the laminated structure. The damping structural layer may increase energy loss of the laminated structure during the vibration process, especially the loss in the resonance frequency range. A damping coefficient may be described by the reciprocal of mechanical quality factor 1/Q as follows:

$$Q^{-1} = \frac{\Delta f}{\sqrt{3} f_0}, \quad (2)$$

wherein $Q^{-1}$ refers to the reciprocal of quality factor, which is also known as a structural loss factor η, Δf refers to the frequency difference f1−f2 at half of a resonance amplitude (also called the "3 dB" bandwidth), and f0 refers to a resonance frequency.

The relationship between the loss factor η of the laminated structure and the loss factor tan δ of the damping material may be as follows:

$$\eta = \frac{XY\tan\delta}{1 + (2+Y)X + (1+Y)\left[1 + (\tan\delta)^2\right]X^2}, \quad (3)$$

wherein X refers to a shear parameter, which is related to the thickness and material properties of each layer of the laminated structure. Y refers to a stiffness parameter, which is related to the thickness and Young's modulus of each layer of the laminated structure.

Figure 2:
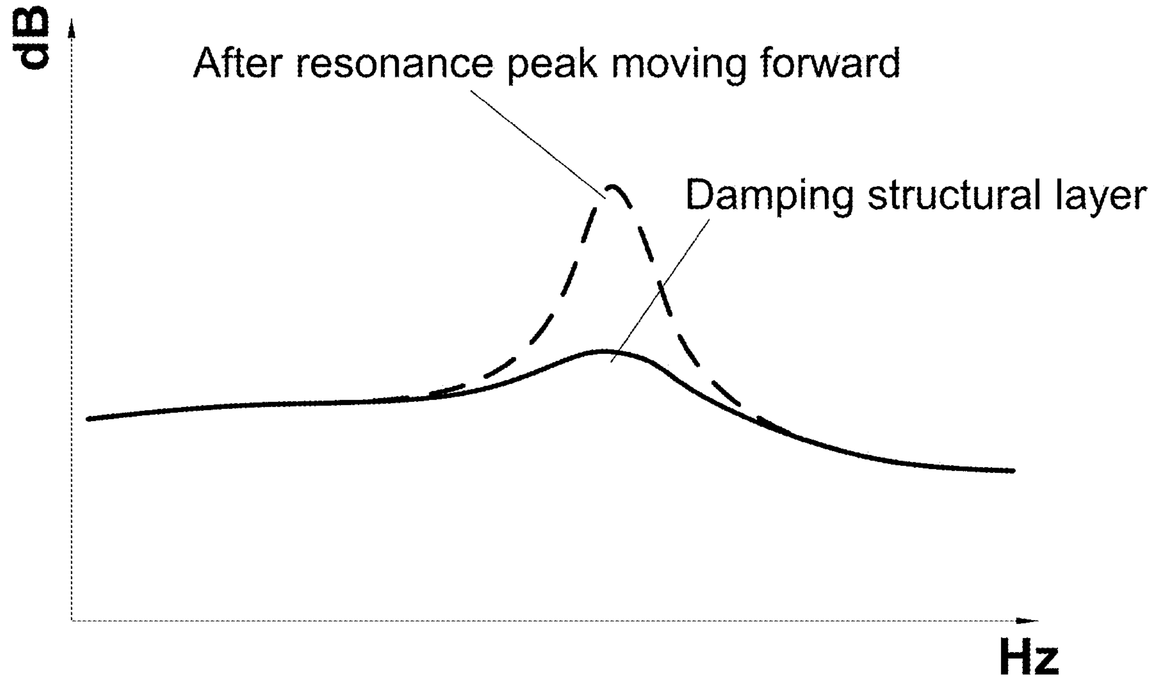
FIG. 2 is a frequency response curve of a bone conduction microphone with or without a damping structural layer according to some embodiments of the present disclosure.

It should be understood that, based on Equation (2) and Equation (3), by adjusting the material of the damping structural layer and the material of the each layer of the laminated structure, the loss factor η of the laminated structure may be adjusted in a suitable range. As the damping of the damping structural layer increases, the mechanical quality factor Q may decrease, and the corresponding "3 dB" bandwidth may increase. The damping of the damping structural layer may be different under different stress (deformation) states. For example, relatively great damping may be present at high stress or a large amplitude. Therefore, the characteristics of the laminated structure with the small amplitude in the non-resonance area and the large amplitude in the resonance area may be used. By adding the damping structural layer, the Q value of the resonance area may be reduced while ensuring that the sensitivity of the bone conduction microphone in the non-resonance area is not reduced, so that the frequency response of the bone conduction microphone may be relatively flat in the entire frequency range. FIG. 2 is a frequency response curve of a bone conduction microphone with or without a damping structural layer according to some embodiments of the present disclosure. As shown in FIG. 2, the frequency response curve of the electrical signal output by the bone conduction microphone with the damping structural layer may be relatively flat compared to the frequency response curve of the electrical signal output by the bone conduction microphone without the damping structural layer.

Figure 3:
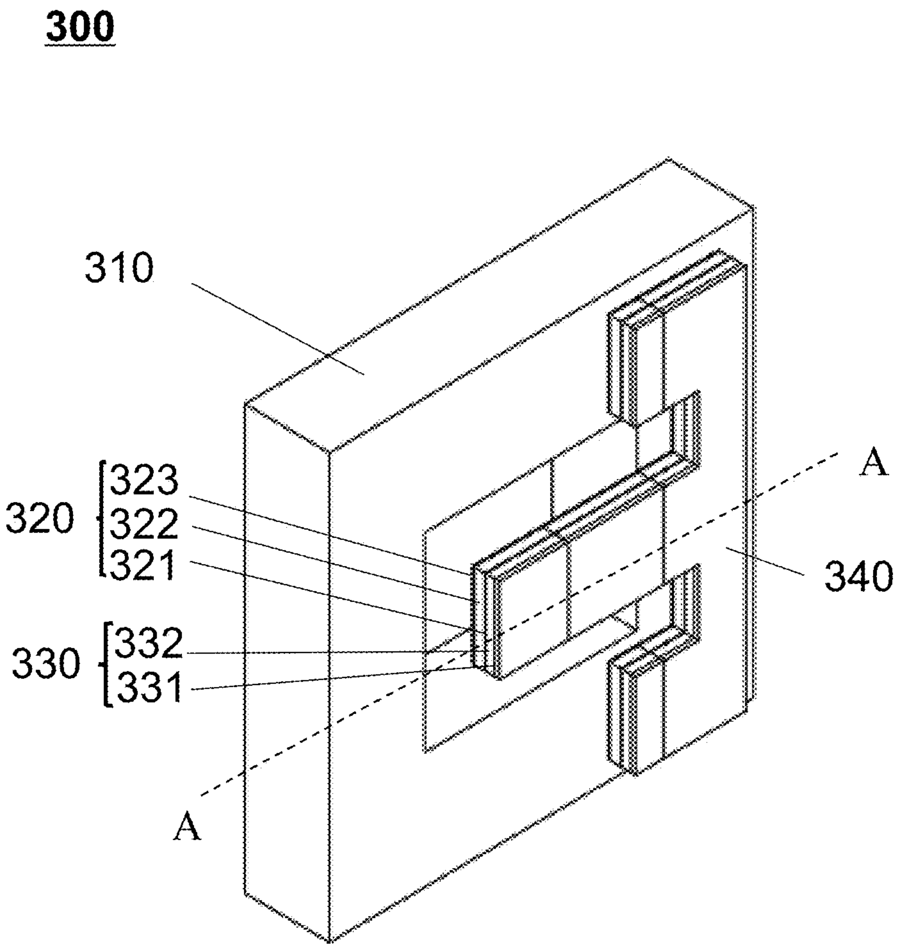
FIG. 3 is a schematic structural diagram of a bone conduction microphone according to some embodiments of the present disclosure.
Figure 4:
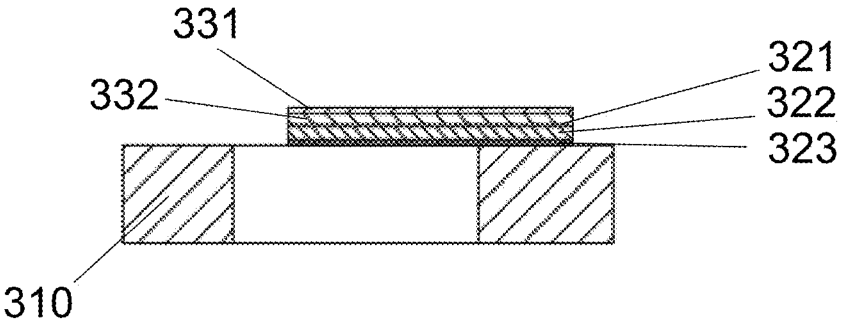
FIG. 4 is a sectional view of a bone conduction microphone at A-A according to some embodiments of the present disclosure.

FIG. 3 is a schematic structural diagram of a bone conduction microphone according to some embodiments of the present disclosure. FIG. 4 is a sectional view of a bone conduction microphone at A-A shown in FIG. 3.

As shown in FIG. 3 and FIG. 4, the bone conduction microphone 300 may include the base structure 310 and the laminated structure, wherein at least part of the laminated structure may be connected to the base structure 310. The base structure 310 may be an inner-hollow frame structure, and part of the laminated structure (e.g., one end of the laminated structure that is away from the connection between the base structure 310 and the laminated structure) may be arranged in the hollow part of the frame structure. It should be noted that the frame structure may not be limited to the rectangular shape shown in FIG. 3. In some embodiments, the frame structure may be a regular or irregular structure such as a pyramid, a cylinder, or the like. In some embodiments, the laminated structure may be fixedly connected to the base structure 310 in the form of the cantilever beam. In some embodiments, the laminated structure may include a fixed end and a free end. The fixed end of the laminated structure may be fixedly connected with the frame structure, and the free end of the laminated structure may not be connected or in contact with the frame structure, so that the free end of the laminated structure may be suspended in the hollow part of the frame structure. In some embodiments, the fixed end of the laminated structure may be connected to the upper surface and the lower surface of the base structure 310, or the sidewall where the hollow part of the base structure 310 is located. In some embodiments, the sidewall where the hollow part of the base structure 310 is located may further be provided with a mounting groove adapted to the fixed end of the laminated structure, so that the fixed end of the laminated structure may be connected to the base structure 310 in a cooperative manner. In some embodiments, in order to improve the stability between the laminated structure and the base structure 310, the laminated structure may include a connection seat 340. Merely as an example, as shown in FIG. 3, the connection seat 340 may be fixed to the fixed end on the surface of the laminated structure. In some embodiments, the fixed end of the connection seat 340 may be arranged on the upper surface or the lower surface of the base structure 310. In some embodiments, the fixed end of the connection seat 340 may also be arranged at the sidewall where the hollow part of the base structure 310 is located. For example, the sidewall where the hollow part of the base structure 310 is located may be arranged with a mounting groove adapted to the fixed end, so that the fixed end of the laminated structure and the base structure 310 may be connected and matched to each other via the mounting groove. The "connection" herein may be understood as after the laminated structure and the base structure 310 are prepared, respectively, the laminated structure and the base structure may be fixedly connected by welding, riveting, bonding, bolting, clamping, or the like. Alternatively, in the preparation process, the laminated structure may be deposited on the base structure 310 by means of physical deposition (e.g., physical vapor deposition) or chemical deposition (e.g., chemical vapor deposition). In some embodiments, the connection seat 340 may be a separate structure from the laminated structure or integrally formed with the laminated structure.

In some embodiments, the laminated structure may include an acoustic transducer unit 320 and a vibration unit 330. The vibration unit 330 may refer to the part of the laminated structure that may be elastically deformed, and the acoustic transducer unit 320 may refer to the part of the laminated structure that converts the deformation of the vibration unit 330 into the electrical signal. In some embodiments, the vibration unit 330 may be arranged on the upper surface or the lower surface of the acoustic transducer unit 320. In some embodiments, the vibration unit 330 may include at least one elastic layer. Merely as an example, as shown in FIG. 3, the vibration unit 330 may include a first elastic layer 331 and a second elastic layer 332 arranged in sequence from top to bottom. The first elastic layer 331 and the second elastic layer 332 may be plate-shaped structures made of semiconductor materials. In some embodiments, the semiconductor material may include silica, silicon nitride, gallium nitride, zinc oxide, silicon carbide, or the like. In some embodiments, the materials of the first elastic layer 331 and the second elastic layer 332 may be the same or different. In some embodiments, the acoustic transducer unit 320 may at least include a first electrode layer 321, a piezoelectric layer 322, and a second electrode layer 323 arranged in sequence from top to bottom. The elastic layers (e.g., the first elastic layer 331 and the second elastic layer 332) may be arranged on the upper surface of the first electrode layer 321 or the lower surface of the second electrode layer 323. The piezoelectric layer 322 may generate a voltage (potential difference) under the action of the deformation stress of the vibration unit 330 (e.g., the first elastic layer 331 and the second elastic layer 332) based on the piezoelectric effect, and the first electrode layer 321 and the second electrode layer 323 may derive the voltage (the electrical signal). In some embodiments, the material of the piezoelectric layer may include piezoelectric crystal material and piezoelectric ceramic material. The piezoelectric crystal material may refer to a piezoelectric single crystal. In some embodiments, the piezoelectric crystal material may include crystal, sphalerite, cristobalite, tourmaline, zincite, GaAs, barium titanate, and the derivative structural crystals of the barium titanate, $KH_2PO_4$, $NaKC_4H_4O_6$ $4H_2O$ (Rochelle salt), or the like, or any combination thereof. The piezoelectric ceramic material may refer to the piezoelectric polycrystals formed by a random collection of fine crystal grains obtained by the solid-phase reaction and the sintering between the powders of different materials. In some embodiments, the piezoelectric ceramic material may include barium titanate (BT), lead zirconate titanate (PZT), lead barium lithium niobate (PBLN), modified lead titanate (PT), aluminum nitride (AlN), zinc oxide (ZnO), or the like, or any combination thereof. In some embodiments, the piezoelectric layer material may also be a piezoelectric polymer material, such as polyvinylidene fluoride (PVDF), or the like. In some embodiments, the first electrode layer 321 and the second electrode layer 323 may be conductive material structures. An exemplary conductive material may include metal, alloy material, metal oxide material, graphene, or the like, or any combination thereof. In some embodiments, the metal and the alloy material may include nickel, iron, lead, platinum, titanium, copper, molybdenum, zinc, or the like, or any combination thereof. In some embodiments, the alloy material may include copper-zinc alloy, copper tin alloy, copper-nickel-silicon alloy, copper chrome alloy, copper silver alloy, or the like, or any combination thereof. In some embodiments, the metal oxide material may include $RuO_2$, $MnO_2$, $PBO_2$, NiO, or the like, or any combination thereof.

When relative movement occurs between the laminated structure and the base structure 310, the vibration unit 330 (e.g., the first elastic layer 331 or the second elastic layer 332) of the laminated structure may have different deformation degrees at different positions. That is, different positions of the vibration unit 330 may generate different deformation stresses on the piezoelectric layer 322 of the acoustic transducer unit 320. In some embodiments, in order to improve the sensitivity of the bone conduction microphone, the acoustic transducer unit 320 may only be arranged at a position that the vibration unit 330 is greatly deformed, thereby improving the signal-to-noise ratio of the bone conduction microphone 300. Accordingly, an area of the first electrode layer 321, the piezoelectric layer 322, and/or the second electrode layer 323 of the acoustic transducer unit 320 may not be larger than that of the vibration unit 330. In some embodiments, in order to further improve the signal-to-noise ratio of the bone conduction microphone 300, the area covered by the acoustic transducer unit 320 on the vibration unit 330 may not be greater than ½ of the area of the vibration unit 330. In some embodiments, the area covered by the acoustic transducer unit 320 on the vibration unit 330 may not be greater than ⅓ of the area of the vibration unit 330. In some embodiments, the area covered by the acoustic transducer unit 320 on the vibration unit 330 may not be greater than ¼ of the area of the vibration unit 330. In some embodiments, the position of the acoustic transducer unit 320 may be close to the connection between the laminated structure and the base structure 310. When the vibration unit 330 (e.g., the elastic layer) is subjected to an external force near the connection between the laminated structure and the base structure 310, the deformation degree may be relatively large, the acoustic transducer unit 320 may also be subjected to relatively large deformation stress near the connection between the laminated structure and the base structure 310. The acoustic transducer unit 320 arranged in an area with large deformation stress may improve the signal-to-noise ratio of the bone conduction microphone 300 on the basis of improving the sensitivity of the bone conduction microphone 300. It should be noted that the connection between the acoustic transducer unit 320 and the base structure 310 that may be close to the laminated structure is relative to the free end of the laminated structure. That is, a distance from the acoustic transducer unit 320 to the connection between the laminated structure and the base structure 310 may be smaller than a distance from the acoustic transducer unit 320 to the free end. In some embodiments, the sensitivity and the signal-to-noise ratio of the bone conduction microphone 300 may be improved only by adjusting the area and the position of the piezoelectric layer 322 of the acoustic transducer unit 320. For example, the first electrode layer 321 and the second electrode layer 323 may completely or partially cover the surface of the vibration unit 330, and the area of the piezoelectric layer 322 may not be greater than that of the first electrode layer 321 or the second electrode layer 323. In some embodiments, the area of the piezoelectric layer 322 covered on the first electrode layer 321 or the second electrode layer 323 may not be greater than ½ of the area of the first electrode layer 321 or the second electrode layer 323. In some embodiments, the area of the piezoelectric layer 322 covered on the first electrode layer 321 or the second electrode layer 323 may not be greater than ⅓ of the area of the first electrode layer 321 or the second electrode layer 323. In some embodiments, the area of the piezoelectric layer 322 covered on the first electrode layer 321 or the second electrode layer 323 may not be greater than the area of the first electrode layer 321 or ¼ of the second electrode layer 323. In some embodiments, in order to prevent the problem of short circuit caused by connecting the first electrode layer 321 and the second electrode layer 323, the area of the first electrode layer 321 may be smaller than that of the piezoelectric layer 322 or the second electrode layer 323. For example, the piezoelectric layer 322, the second electrode layer 323, and the vibration unit 330 may have the same area, and the area of the first electrode layer 321 may be smaller than that of the vibration unit 330 (e.g., the elastic layer), the piezoelectric layer 322, or the second electrode layer 323. An entire area of the first electrode layer 321 may be covered by the piezoelectric layer 322, and an edge of the first electrode layer 321 may have a certain distance from an edge of the piezoelectric layer 322, so that the first electrode layer 321 may avoid the area with poor material quality at the edge of the piezoelectric layer 322, thereby further improving the signal-to-noise ratio of the bone conduction microphone 300.

In some embodiments, in order to increase the output electrical signal and improve the signal-to-noise ratio of the bone conduction microphone, the piezoelectric layer 322 may be arranged on one side of a neutral layer of the laminated structure. The neutral layer may refer to a plane layer of the laminated structure with the deformation stress being approximately zero when deformation occurs. In some embodiments, the signal-to-noise ratio of the bone conduction microphone may also be improved by adjusting (e.g., increasing) the stress and stress variation gradient of the piezoelectric layer 322 per unit thickness thereof. In some embodiments, the signal-to-noise ratio and the sensitivity of the bone conduction microphone 300 may also be improved by adjusting the shape, thickness, material, and size (e.g., length, width, thickness) of the acoustic transducer unit 320 (e.g., the first electrode layer 321, the piezoelectric layer 322, the second electrode layer 323) and the vibration unit 330 (e.g., the first elastic layer 331, the second elastic layer 332).

In some embodiments, in order to control the warpage deformation problem of the laminated structure, the stress of each layer of the laminated structure may need to be balanced, so that an upper part and a lower part of the neutral layer of the cantilever beam may receive the same type of stress (e.g., tensile stress, compressive stress) with equal magnitude. For example, when the piezoelectric layer 322 is a layer of AlN material, the piezoelectric layer 322 may be arranged on one side of the neutral layer of the cantilever beam. The layer of AlN material may be usually tensile stress, and the comprehensive stress of the elastic layer arranged on the other side of the neutral layer may also be tensile stress.

In some embodiments, the acoustic transducer unit 320 may also include a seed layer (not shown in the figure) used to provide a good growth surface structure for other layers, and the seed layer may be arranged on the lower surface of the second electrode layer 323. In some embodiments, the material of the seed layer may be the same as the material of the piezoelectric layer 322. For example, when the material of the piezoelectric layer 322 is AlN, the material of the seed layer may also be AlN. It should be noted that when the acoustic transducer unit 320 is arranged on the lower surface of the second electrode layer 323, the seed layer may be arranged on the upper surface of the first electrode layer 321. When the acoustic transducer unit 320 includes the seed layer, the vibration unit 330 (e.g., the first elastic layer 331, the second elastic layer 332) may be arranged on a surface of the seed layer facing away from the piezoelectric layer 322. In some embodiments, the material of the seed layer may also be different from the material of the piezoelectric layer 322.

It should be noted that the shape of the laminated structure may not be limited to the rectangle shown in FIG. 3, but may also be regular or irregular shapes such as triangle, trapezoid, circle, semi-circle, ¼ circle, ellipse, semi-ellipse, or the like, which is not limited herein. In some embodiments, the laminated structure of the bone conduction microphone may be trapezoidal in shape. Further, the width of the laminated structure may be tapered from the free end to the fixed end. In addition, the count of the laminated structures may not be limited to the one shown in FIG. 3, but may also be two, three, four, or more. Different laminated structures may be suspended side by side in the hollow part of the base structure, or may be suspended in sequence in the hollow part of the base structure along an arrangement direction of each layer of the laminated structure.

Figure 5:
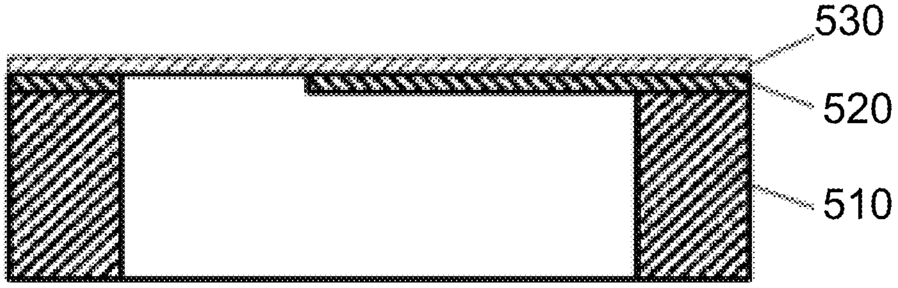
FIG. 5 is a sectional view of a bone conduction microphone according to some embodiments of the present disclosure.

FIG. 5 is a sectional view of a bone conduction microphone according to some embodiments of the present disclosure. As shown in FIG. 5, the bone conduction microphone 500 may include a base structure 510, a laminated structure 520, and a damping structural layer 530. One end of the laminated structure 520 may be connected to the upper surface of the base structure 510, the other end of the laminated structure 520 may be suspended in the hollow part of the base structure 510, and the damping structural layer 530 may be arranged on the upper surface of the laminated structure 520. In some embodiments, the area of the damping structural layer 530 may be greater than that of the laminated structure 520, so that the damping structural layer 530 may further cover the upper surface of the base structure 510 while covering the upper surface of the laminated structure 520. In some embodiments, at least a part of the circumference of the damping structural layer 530 may be fixed on the base structure 510. Taking the laminated structure 520 of the cantilever beam structure as an example, the damping structural layer 530 may cover the upper surface of the cantilever beam and the upper surface of the base structure 510 simultaneously, which is equivalent to an effect that the damping structural layer 530 plays a role of connecting the upper surface of the cantilever beam and the upper surface of the base structure 510. Alternatively, the damping structural layer 530 may completely or only partially cover the upper surface of the base structure 510. For example, the damping structural layer 530 may be a strip-shaped structure extending along a length direction of the cantilever beam. Except for the upper surface of the cantilever beam, the damping structural layer 530 may extend along the length direction of the cantilever beam and cover a partial area of the upper surface of the base structure 510. As another example, the damping structural layer 530 may be a suspended film structure, which may completely cover the base structure 510 and the upper surface of the cantilever beam.

Figure 6:
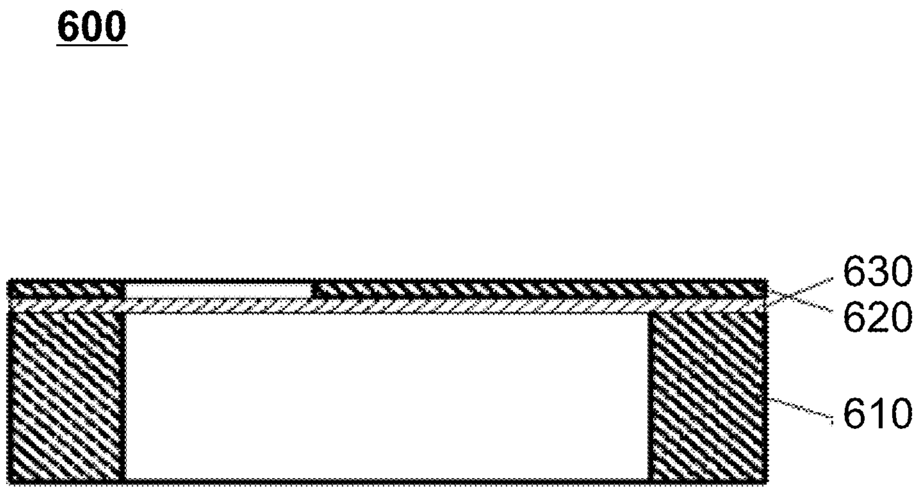
FIG. 6 is a sectional view of a bone conduction microphone according to some embodiments of the present disclosure.

FIG. 6 is a sectional view of a bone conduction microphone according to some embodiments of the present disclosure. As shown in FIG. 6, the bone conduction microphone 600 may include a base structure 610, a laminated structure 620, and a damping structural layer 630. The damping structural layer 630 may be connected to the upper surface of the base structure 610, and the lower surface of the laminated structure 620 may be connected to the upper surface of the damping structural layer 630. In some embodiments, the area of the damping structural layer 630 may be greater than that of the laminated structure 620, so that the damping structural layer 630 may further cover the upper surface of the base structure 610 while covering the upper surface of the laminated structure 620. Alternatively, the damping structural layer 630 may cover completely or only partially cover the upper surface of the base structure 610. For example, the damping structural layer 630 may be a strip-shaped structure extending along a length direction of the cantilever beam, and the damping structural layer 630 may extend along the length direction of the cantilever beam and cover a partial area of the upper surface of the base structure 610. As another example, the damping structural layer 630 may be a suspended film structure, which may completely cover the upper surface of the base structure 610.

In some embodiments, the material of the damping structural layer (e.g., the damping structural layer 530, the damping structural layer 630) may be polyurethane material, epoxy resin material, acrylic material, silicone rubber material, PVC material, or the like, or any combination thereof. In some embodiments, the material of the damping structural layer may be polyurethane material, epoxy resin material, acrylic, or other viscoelastic damping materials. In some embodiments, when the damping structural layer of the bone conduction microphone is arranged on the upper surface or the lower surface of the laminated structure, Young's modulus of the material of the damping structural layer may be in a range of $10^6$ Pa~$10^{10}$ Pa. In some embodiments, the Young's modulus of the material of the damping structural layer may be in a range of $10^6$ Pa~$10^9$ Pa. In some embodiments, the Young's modulus of the material of the damping structural layer may be in a range of $10^6$ Pa~$10^8$ Pa. In some embodiments, the Young's modulus of the material of the damping structural layer may be in a range of $10^6$ Pa~$10^7$ Pa. In some embodiments, the density of the material of the damping structural layer may be in a range of $0.7\times10^3$ kg/m$^3$~$2\times10^3$ kg/m$^3$. In some embodiments, the density of the material of the damping structural layer may be in a range of $0.8\times10^3$ kg/m$^3$~$1.9\times10^3$ kg/m$^3$. In some embodiments, the density of the material of the damping structural layer may be in a range of $0.9\times10^3$ kg/m3~$1.8\times10^3$ kg/m$^3$. In some embodiments, the density of the material of the damping structural layer may be in a range of $1\times10^3$ kg/m$^3$~$1.6\times10^3$ kg/m$^3$. In some embodiments, the density of the material of the damping structural layer may be in a range of $1.2\times10^3$ kg/m$^3$~$1.4\times10^3$ kg/m$^3$. In some embodiments, a Poisson's ratio of the material of the damping structural layer may be in a range of 0.4~0.5. In some embodiments, a Poisson's ratio of the material of the damping structural layer may be in a range of 0.41~0.49. In some embodiments, a Poisson's ratio of the material of the damping structural layer may be in a range of 0.42~0.48. In some embodiments, a Poisson's ratio of the material of the damping structural layer may be in a range of 0.43~0.47. In some embodiments, a Poisson's ratio of the material of the damping structural layer may be in a range of 0.44~0.46. In some embodiments, the thickness of the damping structural layer may be in a range of 0.1 um~10 um. In some embodiments, the thickness of the damping structural layer may be in a range of 0.1 um~5 um. In some embodiments, the thickness of the damping structural layer may be in a range of 0.2 um~4.5 um. In some embodiments, the thickness of the damping structural layer may be in a range of 0.3 um~4 um. In some embodiments, the thickness of the damping structural layer may be in a range of 0.4 um~3.5 um. In some embodiments, the thickness of the damping structural layer may be in a range of 0.5 um~3 um.

Figure 7:
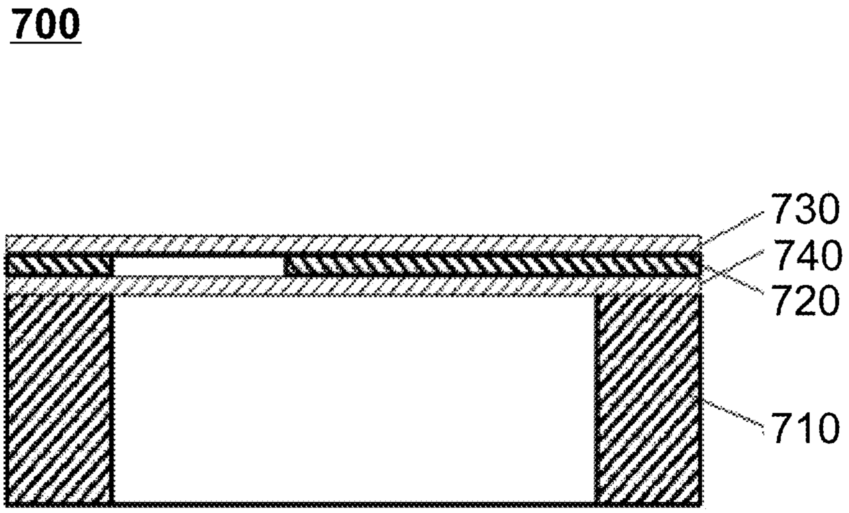
FIG. 7 is a sectional view of a bone conduction microphone according to some embodiments of the present disclosure.

FIG. 7 is a sectional view of the bone conduction microphone according to some embodiments of the present disclosure. As shown in FIG. 7, the bone conduction microphone 700 may include a base structure 710, a laminated structure 720, and two damping structural layers. The two damping structural layers may include a first damping structural layer 730 and a second damping structural layer 740. The second damping structural layer 740 may be connected to the upper surface of the base structure 710, the lower surface of the laminated structure 720 may be connected to the upper surface of the second damping structural layer 740, and the first damping structural layer 730 may be connected to the upper surface of the laminated structure 720. The area of the first damping structural layer 730 and/or the second damping structural layer 740 may be greater than that of the laminated structure 720. Alternatively, the damping structural layer 730 or 740 may cover completely or only partially cover the upper surface of the base structure 710. For example, the damping structural layer 730 or 740 may be a strip-shaped structure extending along a length direction of the cantilever beam, and the damping structural layer 730 or 740 may extend along the length direction of the cantilever beam and cover a partial area of the upper surface of the base structure 710. As another example, the damping structural layer 730 or 740 may be a suspended film structure, which may completely cover the upper surface of the base structure 710.

In some embodiments, when the first damping structural layer 730 of the bone conduction microphone (e.g., the bone conduction microphone 700) is arranged on the upper surface of the laminated structure, and the second damping structural layer 740 is arranged on the lower surface of the laminated structure, the Young's modulus of the material of the damping structural layer may be in a range of $10^6$ Pa~$10^7$ Pa. In some embodiments, the Young's modulus of the material of the damping structural layer may be in a range of $10^6$ Pa~$0.8\times10^7$ Pa. In some embodiments, the Young's modulus of the material of the damping structural layer may be in a range of $10^6$ Pa~$0.5\times10^7$ Pa. In some embodiments, the density of the material of the damping structural layer may be in a range of $0.7\times10^3$ kg/m$^3$~$1.2\times10^3$ kg/m$^3$. In some embodiments, the density of the material of the damping structural layer may be in a range of $0.75\times10^3$ kg/m$^3$~$1.1\times10^3$ kg/m$^3$. In some embodiments, the density of the material of the damping structural layer may be in a range of $0.8\times10^3$ kg/m$^3$~$1\times10^3$ kg/m$^3$. In some embodiments, the density of the material of the damping structural layer may be in a range of $0.85\times10^3$ kg/m$^3$~$0.9\times10^3$ kg/m$^3$. In some embodiments, a Poisson's ratio of the material of the damping structural layer may be in a range of 0.4~0.5. In some embodiments, a Poisson's ratio of the material of the damping structural layer may be in a range of 0.41~0.49. In some embodiments, a Poisson's ratio of the material of the damping structural layer may be in a range of 0.42~0.48. In some embodiments, a Poisson's ratio of the material of the damping structural layer may be in a range of 0.43~0.47. In some embodiments, a Poisson's ratio of the material of the damping structural layer may be in a range of 0.44~0.46. In some embodiments, the thickness of each damping structural layer may be slightly smaller than the thickness of the damping structural layer of the bone conduction microphone with only a single damping structural layer. For example, the thickness of a damping film of the material of each damping structural layer may be in a range of 0.1 um~10 um. The thickness of the damping film of the material of each damping structural layer may be in a range of 0.1 um~3 um. In some embodiments, the thickness of the damping film of the material of each damping structural layer may be in a range of 0.12 um~2.9 um. In some embodiments, the thickness of the damping film of the material of each damping structural layer may be in a range of 0.14 um~2.8 um. In some embodiments, the thickness of the damping film of the material of each damping structural layer may be in a range of 0.16 um~2.7 um. In some embodiments, the thickness of the damping film of the material of each damping structural layer may be in a range of 0.18 um~2.6 um. In some embodiments, the thickness of the damping film of the material of each damping structural layer may be in a range of 0.2 um~2.5 um. In some embodiments, the thickness of the damping film of the material of each damping structural layer may be in a range of 0.21 um~2.3 um.

Figure 8:
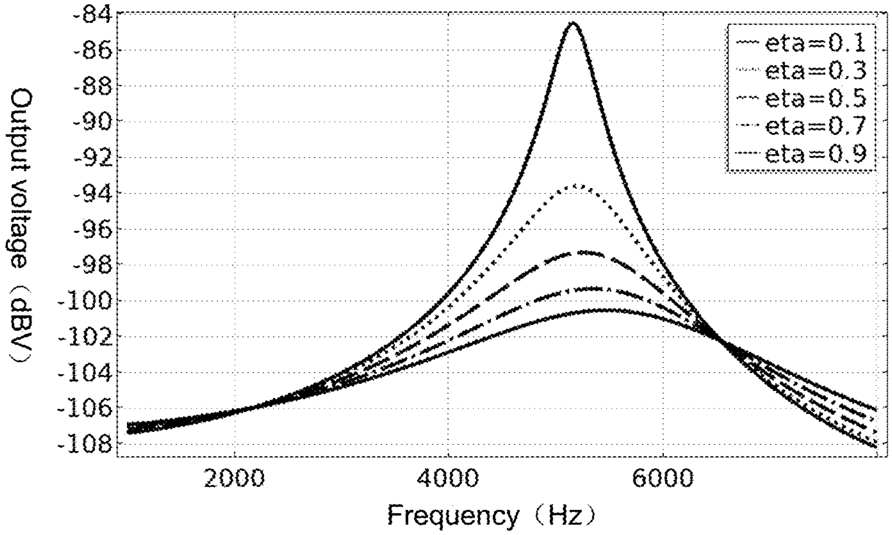
FIG. 8 is a frequency response curve of an output voltage of a bone conduction microphone in a cantilever form.

In some embodiments, an output voltage of the bone conduction microphone may be changed by adjusting an isotropic structural loss factor of the damping structural layer, which may reduce the Q value of the resonance area while ensuring that the sensitivity of the bone conduction microphone in the non-resonance area is not reduced, so that the frequency response of the bone conduction microphone may be relatively flat in the entire frequency range. FIG. 8 is a frequency response curve of an output voltage of a bone conduction microphone in a cantilever beam form. As shown in FIG. 8, eta refers to the isotropic structural loss factor of the material of the damping structural layer of the bone conduction microphone shown in FIG. 5, the abscissa is the frequency (Hz), and the ordinate is the output voltage (dBV) of a device. It may be seen from FIG. 8 that when the thickness of the damping structural layer is constant and the loss factor of the material of the damping structural layer is 0.1, the output voltage of the bone conduction microphone may have a larger peak value in the resonance area (e.g., 4000 Hz-6000 Hz). As the loss factor of the material of the damping structural layer increases, the peak value of the output voltage of the bone conduction microphone in the resonance area may gradually decrease. In some embodiments, an isotropic structural loss factor of the material of the damping structural layer may be in a range of 0.1~2. In some embodiments, an isotropic structural loss factor of the material of the damping structural layer may be in a range of 0.2~1.9. In some embodiments, an isotropic structural loss factor of the material of the damping structural layer may be in a range of 0.3~1.7. In some embodiments, an isotropic structural loss factor of the material of the damping structural layer may be in a range of 0.4~1.5. In some embodiments, an isotropic structural loss factor of the material of the damping structural layer may be in a range of 0.5~1.2. In some embodiments, an isotropic structural loss factor of the material of the damping structural layer may be in a range of 0.7~1.

It should be noted that the position of the damping structural layer 530 may not be limited to the upper surface of the laminated structure shown in FIG. 5, the position of the damping structural layer 630 may not be limited to the lower surface of the laminated structure shown in FIG. 6, and the damping structural layer 730 and the damping structural layer 740 may not be limited to the upper surface and the lower surface of the laminated structure shown in FIG. 7. In some embodiments, the damping structural layer may also be arranged between the multi-layered layered structures of the laminated structure. For example, the damping structural layer may be arranged between the elastic layer and the first electrode layer. As another example, the damping structural layer may also be arranged between the first elastic layer and the second elastic layer of the vibration unit. For details of the base structure and the laminated structure shown in FIG. 5, FIG. 6, and FIG. 7, refer to FIG. 3, FIG. 4, and the related descriptions in the present disclosure, which are not repeated herein.

Figure 9:
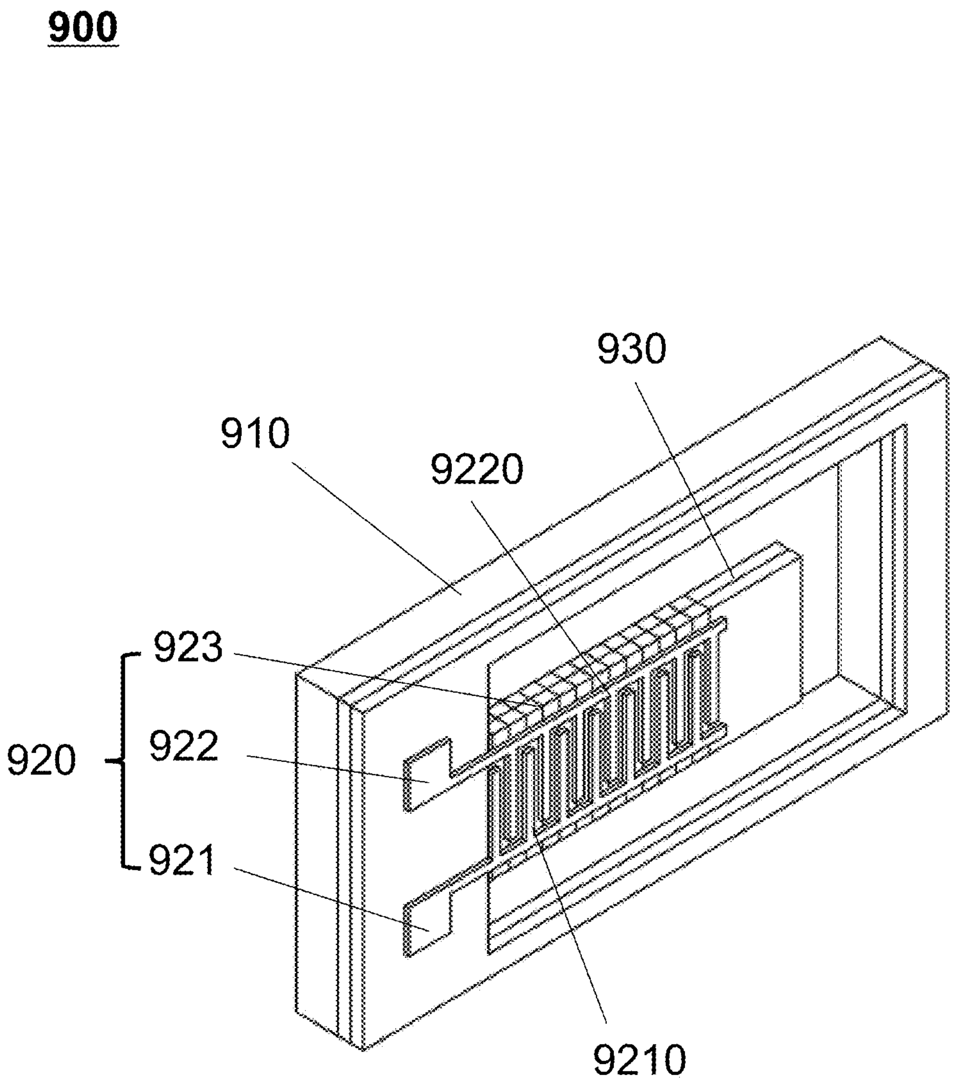
FIG. 9 is a schematic structural diagram of a bone conduction microphone according to some embodiments of the present disclosure.

FIG. 9 is a schematic structural diagram of a bone conduction microphone according to some embodiments of the present disclosure. As shown in FIG. 9, a bone conduction microphone 900 may include a base structure 910 and a laminated structure, and at least part of the laminated structure may be connected to the base structure 910. For more details about the base structure 910, refer to the related descriptions of the base structure 310 shown in FIG. 3, which is not repeated herein. For more details about the connection manner of the base structure 910 and the laminated structure, refer to the related descriptions of FIG. 3, which are not repeated herein.

In some embodiments, the laminated structure may include an acoustic transducer unit 920 and a vibration unit 930. The vibration unit 930 may be arranged on an upper surface or a lower surface of the acoustic transducer unit 920. In some embodiments, the vibration unit 930 may include at least one elastic layer. The elastic layer may be a plate-shaped structure made of semiconductor material. In some embodiments, the semiconductor material may include silica, silicon nitride, gallium nitride, zinc oxide, silicon carbide, or the like. In some embodiments, the acoustic transducer unit 920 may include an electrode layer and a piezoelectric layer 923. The electrode layer may include a first electrode 921 and a second electrode 922. In some embodiments, the piezoelectric layer 923 may generate a voltage (potential difference) under the action of the deformation stress of the vibration unit 930 based on the piezoelectric effect. The first electrode 921 and the second electrode 922 may derive the voltage (the electrical signal). In some embodiments, the first electrode 921 and the second electrode 922 may be arranged on the same surface (e.g., the upper surface or the lower surface) of the piezoelectric layer 923 at intervals. The electrode layer and the vibration unit 930 may be arranged on different surfaces of the piezoelectric layer 923. For example, when the vibration unit 930 is arranged on the lower surface of the piezoelectric layer 923, the electrode layers (the first electrode 921 and the second electrode 922) may be arranged on the upper surface of the piezoelectric layer 923. As another example, when the vibration unit 930 is arranged on the upper surface of the piezoelectric layer 923, the electrode layers (the first electrode 921 and the second electrode 922) may be arranged on the lower surface of the piezoelectric layer 923. In some embodiments, the electrode layer and the vibration unit 930 may also be arranged on the same side of the piezoelectric layer 923. For example, the electrode layer may be arranged between the piezoelectric layer 923 and the vibration unit 930. In some embodiments, the first electrode 921 may be bent into a first comb-shaped structure 9210. The first comb-shaped structure 9210 may include a plurality of comb structures. A first distance may exist between adjacent comb structures of the first comb-shaped structure 9210, and the first distance may be the same or different. The second electrode 921 may be bent into a second comb-shaped structure 9210. The second comb-shaped structure 9210 may include a plurality of comb structures. A second distance may exist between adjacent comb structures of the second comb-shaped structure 9210, and the second distance may be the same or different. The first comb-shaped structure 9210 may cooperate with the second comb-shaped structure 9220 to form an electrode layer. The comb structure of the first comb-shaped structure 9210 may extend into the second distance of the second comb-shaped structure 9220, and the comb structure of the second comb-shaped structure 9220 may extend into the first distance of the first comb-shaped structure 9210 to cooperate with each other to form the electrode layer. The first comb-shaped structure 9210 and the second comb-shaped structure 9220 may cooperate with each other so that the first electrodes 921 and the second electrodes 922 may be compactly arranged but not intersect with each other. In some embodiments, the first comb-shaped structure 9210 and the second comb-shaped structure 9220 may extend along the length direction of the cantilever beam (e.g., the direction from the fixed end to the free end). In some embodiments, the material of the piezoelectric layer 923 may be a piezoelectric ceramic material. When the piezoelectric layer 923 is made of the piezoelectric ceramic material, a polarization direction of the piezoelectric layer 923 may be consistent with the length direction of the cantilever beam. A characteristic of a piezoelectric constant d33 of the piezoelectric ceramics may be used to greatly enhance the output signal strength and improve the sensitivity. The piezoelectric constant d33 may refer to a proportionality constant of the piezoelectric layer converting mechanical energy into electrical energy. It should be noted that the piezoelectric layer 923 shown in FIG. 9 may also be made of other materials. When the polarization direction of the piezoelectric layer 923 made of other materials is consistent with the thickness direction of the cantilever beam, the acoustic transducer unit 920 may be replaced by the acoustic transducer unit 320 shown in FIG. 3.

When relative motion occurs between the laminated structure and the base structure 910, a deformation degree of the vibration unit 930 in the laminated structure may be different at different positions. That is, different positions of the vibration unit 930 may generate different deformation stresses on the piezoelectric layer 923 of the acoustic transducer unit 920. In some embodiments, in order to improve the sensitivity of the bone conduction microphone, the acoustic transducer unit 920 may only be arranged at a position that the vibration unit 930 is deformed to a greater extent, thereby improving the signal-to-noise ratio of the bone conduction microphone 900. Accordingly, the area of the electrode layer and/or the piezoelectric layer 923 of the acoustic transducer unit 920 may not be greater than that of the vibration unit 930. In some embodiments, in order to further improve the signal-to-noise ratio of the bone conduction microphone 900, the area covered by the acoustic transducer unit 920 on the vibration unit 930 may not be greater than the area of the vibration unit 930. In some embodiments, the area covered by the acoustic transducer unit 920 on the vibration unit 930 may not be greater than ½ of the area of the vibration unit 930. In some embodiments, the area covered by the acoustic transducer unit 920 on the vibration unit 930 may not be greater than ⅓ of the area of the vibration unit 930. In some embodiments, the area covered by the acoustic transducer unit 920 on the vibration unit 930 may not be greater than ¼ of the area of the vibration unit 930. In some embodiments, the acoustic transducer unit 130 may be close to the connection between the laminated structure and the base structure 10. Since the vibration unit 930 (e.g., the elastic layer) is deformed to a large degree when the vibration unit 930 is subjected to an external force near the connection between the laminated structure and the base structure 910, and the acoustic transducer unit 920 is also subjected to relatively large deformation stress near the connection between the laminated structure and the base structure 910, the acoustic transducer unit 920 arranged in an area with large deformation stress may improve the signal-to-noise ratio of the bone conduction microphone 900 on the basis of improving the sensitivity of the bone conduction microphone 900. It should be noted that the acoustic transducer unit 920 being close to the connection between the laminated structure and the base structure 910 is relative to the free end of the laminated structure. That is, the distance from the acoustic transducer unit 920 to the connection between the laminated structure and the base structure 910 may be smaller than the distance from the acoustic transducer unit 920 to the free end. In some embodiments, the sensitivity and the signal-to-noise ratio of the bone conduction microphone 900 may be improved only by adjusting the area and the position of the piezoelectric layer 923 in the acoustic transducer unit 920. For example, the electrode layer may completely or partially cover the surface of the vibration unit 930, and the area of the piezoelectric layer 923 may not be greater than that of the electrode layer. In some embodiments, the area covered by the piezoelectric layer 923 on the vibration unit 130 may not be greater than ½ of the area of the electrode layer. In some embodiments, the area covered by the piezoelectric layer 923 on the vibration unit 130 may not be greater than ⅓ of the area of the electrode layer. In some embodiments, the area covered by the piezoelectric layer 923 on the vibration unit 130 may not be greater than ¼ of the area of the electrode layer. In some embodiments, the area of the piezoelectric layer 923 may be the same as that of the vibration unit 930. The entire area of the electrode layer may be covered by the piezoelectric layer 923, and the edge of the electrode layer may have a certain distance from the edge of the piezoelectric layer 923, so that the first electrode 921 and the second electrode 922 in the electrode layer may be made to avoid an area with poor material quality at the edge of the piezoelectric layer 923, thereby further improving the signal-to-noise ratio of the bone conduction microphone 900.

In some embodiments, the bone conduction microphone 900 may further include at least one damping structural layer (not shown in FIG. 9). At least one damping structural layer may be arranged on the upper surface, the lower surface, and/or inside the laminated structure of the bone conduction microphone 900. For example, the damping structural layer may be arranged on the upper surface or the lower surface of the laminated structure. As another example, the damping structural layer may be arranged between the vibration unit 930 and the piezoelectric layer 923. As another example, the damping structural layer may include a first damping structural layer and a second damping structural layer. The first damping structural layer may be arranged on the upper surface of the electrode layer, and the second damping structural layer may be arranged on the lower surface of the vibration unit 930. For more details about a material type, Young's modulus of a material, thickness, density, Poisson's ratio, loss factor, or the like, of the damping structural layer, refer to the related descriptions of FIG. 5-FIG. 8, which is not repeated herein.

Figure 10:
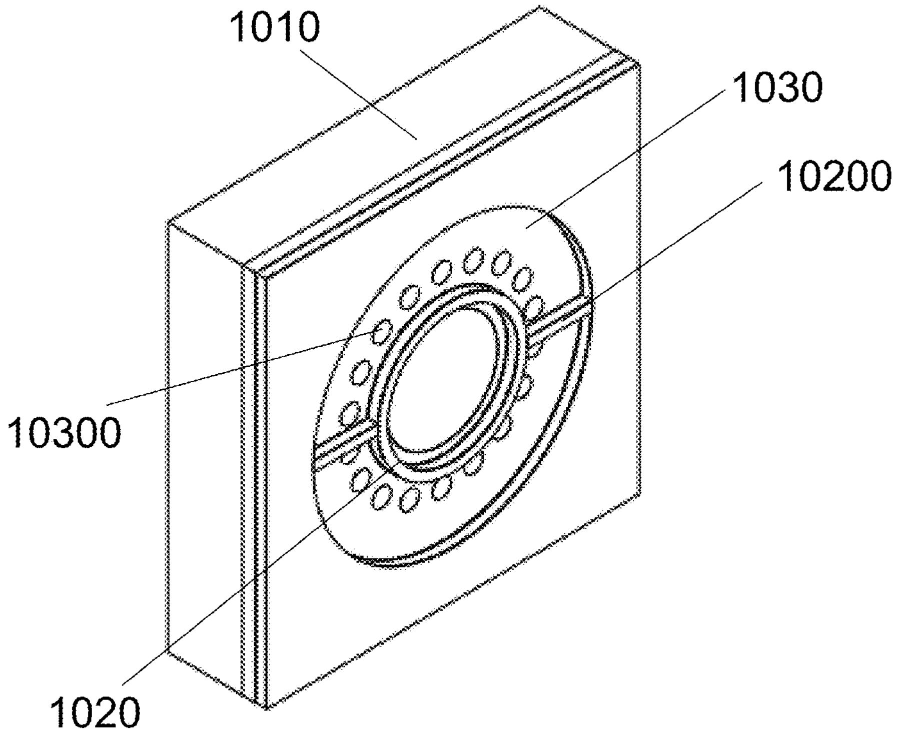
FIG. 10 is a schematic structural diagram of a bone conduction microphone according to some embodiments of the present disclosure.
Figure 11:
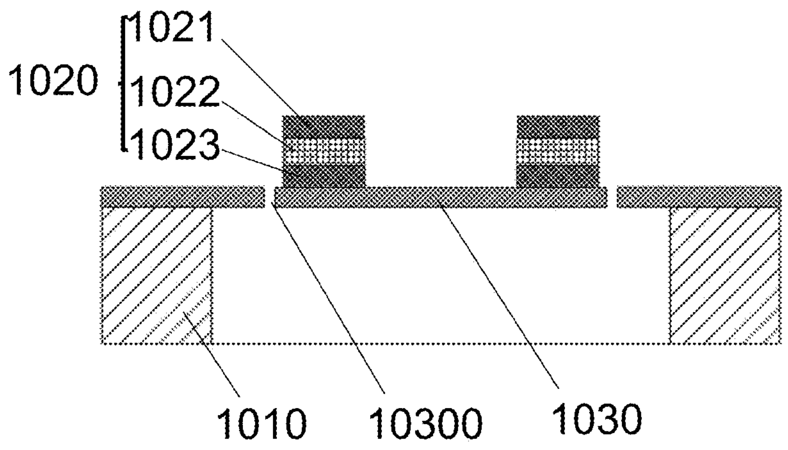
FIG. 11 is a sectional view of a local structure of a bone conduction microphone according to some embodiments of the present disclosure.

FIG. 10 is a schematic structural diagram of a bone conduction microphone according to some embodiments of the present disclosure; FIG. 11 is a sectional view of a partial structure of a bone conduction microphone shown in FIG. 10. As shown in FIG. 10 and FIG. 11, the bone conduction microphone 1000 may include a base structure 1010 and a laminated structure, and at least part of the laminated structure may be connected to the base structure 1010. In some embodiments, the base structure 1010 may be an inner-hollow frame structure, and part of the laminated structure may be arranged in the hollow part of the frame structure. It should be noted that the frame structure may not be limited to the cuboid shape shown in FIG. 10. In some embodiments, the frame structure may be a regular or irregular structure such as a pyramid, a cylinder, or the like.

In some embodiments, the laminated structure may include an acoustic transducer unit 1020 and a vibrating unit. In some embodiments, the vibration unit may be arranged on an upper surface or a lower surface of the acoustic transducer unit 1020. As shown in FIG. 10, the vibration unit may include a suspended film structure 1030. The suspended film structure 1030 may be fixed on the base structure 1010 by connecting with the base structure 1010 through the peripheral side, and the central area of the suspended film structure 1030 may be suspended in the hollow part of the base structure 1010. In some embodiments, the suspended film structure 1030 may be arranged on the upper surface or the lower surface of the base structure 1010. In some embodiments, the peripheral side of the suspended film structure 1030 may also be connected to the inner wall of the hollow part of the base structure 1010. The "connection" herein may be understood as fixing the suspended film structure 1030 to the upper surface, the lower surface of the base structure 1010, or the sidewall of the hollow part of the base structure 1010 by mechanical fixing (e.g., strong bonding, riveting, clipping, inlaying, etc.) after the suspended film structure 1030 and the base structure 1010 are prepared, respectively, or during the preparation process, the suspended film structure 1030 may be arranged on the base structure 1010 by means of physical deposition (e.g., physical vapor deposition) or chemical deposition (e.g., chemical vapor deposition). In some embodiments, the suspended film structure 1030 may include at least one elastic layer. The elastic layer may be a film-shaped structure made of semiconductor material. In some embodiments, the semiconductor material may include silicon dioxide, silicon nitride, gallium nitride, zinc oxide, silicon carbide, or the like. In some embodiments, the shape of the suspended film structure 1030 may be a polygon such as a circle, an ellipse, a triangle, a quadrilateral, a pentagon, a hexagon, or other arbitrary shapes.

In some embodiments, the acoustic transducer unit 1020 may be arranged on the upper surface or the lower surface of the suspended film structure 1030. In some embodiments, the suspended film structure 1030 may include a plurality of holes 10300, and the plurality of holes 10300 may be arranged along the circumference of the acoustic transducer unit 1020 around the center of the acoustic transducer unit 1020. It should be understood that by arranging a number of holes 10300 on the suspended film structure 1030, the stiffness of the suspended film structure 1030 at different positions may be adjusted, so that the stiffness of the suspended film structure 1030 in the area near the plurality of holes 10300 may be reduced, and the stiffness of the suspended film structure 1030 in the area far from the plurality of holes 10300 may be relatively large. When the suspended film structure 1030 and the base structure 1010 move relative to each other, the suspended film structure 1030 in the area near the plurality of holes 10300 may be deformed to a larger degree, and the suspended film structure 1030 in the area far from the plurality of holes 10300 may be deformed to a less degree. The acoustic transducer unit 1020 arranged in the area near the plurality of holes 10300 on the suspended film structure 1030 may be more beneficial for the acoustic transducer unit 1020 to collect the vibration signal, so that the sensitivity of the bone conduction microphone 1000 may be effectively improved, and the structures of the components in the bone conduction microphone 1000 may be relatively simple, which is convenient for production or assembly. In some embodiments, the plurality of holes 10300 arranged on the suspended film structure 1030 may be any shape such as circular holes, oval holes, square holes, or other polygonal holes. In some embodiments, the resonance frequency and the stress distribution of the bone conduction microphone 1000 may also be adjusted by changing the sizes, the number, the distances, and the positions of the plurality of holes 10300 to improve the sensitivity of the bone conduction microphone 1000. It should be noted that the resonance frequency may not be limited to the 2 kHz-5 kHz mentioned above, but may also be 3 kHz-4.5 kHz, or 4 kHz-4.5 kHz. A range of the resonance frequency may be adaptively adjusted according to different application scenarios, which is not limited herein.

In some embodiments, as shown in FIG. 10 and FIG. 11, the acoustic transducer unit 1020 may include a first electrode layer 1021, a piezoelectric layer 1022, and a second electrode layer 1023 arranged in sequence from top to bottom. The positions of the first electrode layer 1021 and the second electrode layer 1022 may be interchanged. The piezoelectric layer 1022 may generate a voltage (potential difference) under the action of the deformation stress of the vibration unit (e.g., the suspended film structure 1030) based on the piezoelectric effect. The first electrode layer 1021 and the second electrode layer 1023 may derive the voltage (the electrical signal). In some embodiments, the material of the piezoelectric layer may include piezoelectric crystal material and piezoelectric ceramic material.

Piezoelectric crystal may refer to a piezoelectric single crystal. In some embodiments, the piezoelectric crystal material may include crystal, sphalerite, cristobalite, tourmaline, red zinc ore, GaAs, barium titanate, and the derivative structural crystals, $KH_2PO_4$, $NaKC_4H_4O_6$ $4H_2O$ (Rochelle salt), sugar, or the like, or any combination thereof. The Piezoelectric ceramic material may refer to piezoelectric polycrystals formed by a random collection of fine grains obtained by solid-phase reaction and sintering between different material powders. In some embodiments, the piezoelectric ceramic material may include barium titanate (BT), lead zirconate titanate (PZT), lead barium lithium niobate (PBLN), modified lead titanate (PT), aluminum nitride (AlN)), zinc oxide (ZnO), or the like, or any combination thereof. In some embodiments, the piezoelectric layer material may also be a piezoelectric polymer material, such as polyvinylidene fluoride (PVDF) or the like. In some embodiments, the first electrode layer 1021 and the second electrode layer 1023 may be made of conductive material structures. An exemplary conductive material may include metal, alloy material, metal oxide material, graphene, or the like, or any combination thereof. In some embodiments, the metal and alloy material may include nickel, iron, lead, platinum, titanium, copper, molybdenum, zinc, or the like, or any combination thereof. In some embodiments, the alloy material may include copper-zinc alloy, copper-tin alloy, copper-nickel-silicon alloy, copper-chromium alloy, copper-silver alloy, or the like, or any combination thereof. In some embodiments, the metal oxide material may include $RuO_2$, $MnO_2$, $PbO_2$, NiO, or the like, or any combination thereof.

In some embodiments, as shown in FIG. 10, the plurality of holes 10300 may enclose a circular area. In order to improve the sound pressure output effect of the acoustic transducer unit 1020, the acoustic transducer unit 1020 may be arranged in the area of the suspended film structure 1030 close to the plurality of holes 10300. The acoustic transducer unit 1020 may be a ring-shaped structure, which is arranged along the inner side of the circular area enclosed by the plurality of holes 10300. In some embodiments, the acoustic transducer units 1020 in the ring-shaped structure may also be arranged along the outer side of the circular area enclosed by the plurality of holes 10300. In some embodiments, the piezoelectric layer 1022 of the acoustic transducer unit 1020 may be a piezoelectric ring, and the first electrode layer 1021 and the second electrode layer 1023 on the upper surface and the lower surface of the piezoelectric ring may be electrode rings. In some embodiments, the acoustic transducer unit 1020 may be further configured with a lead structure 10200, and the lead structure 10200 may be used to transmit the electrical signal collected by the electrode rings (e.g., the first electrode layer 1021 and the second electrode layer 1023) to the subsequent circuit. In some embodiments, in order to improve the output electrical signal of the bone conduction microphone 1000, the distance from the edge of the acoustic transducer unit 1020 (e.g., the ring structure) to the radial direction of the center of each hole 10300 may be 100 um-400 um. In some embodiments, the distance from the edge of the acoustic transducer unit 1020 (e.g., the ring-shaped structure) to the radial direction of the center of each hole 10300 may be 150 um-300 um. In some embodiments, the distance from the edge of the acoustic transducer unit 1020 (e.g., the ring-shaped structure) to the radial direction of the center of each hole 10300 may be 150 um-250 um.

In some embodiments, the shape, size (e.g., length, width, thickness), and material of the lead structure 10200 may also be adjusted to improve the output electrical signal of the bone conduction microphone 1000.

In some embodiments, the deformation stress at different positions of the suspended film structure 1030 may also be changed by adjusting the thickness or density of different areas of the suspended film structure 1030. For illustrative purposes only, in some embodiments, the acoustic transducer unit 1020 may be configured as the ring-shaped structure, and the thickness of the part of the suspended film structure 1030 arranged in the inside area of the ring-shaped structure may be greater than the thickness of the part of the suspended film structure 1030 arranged in the outside area of the ring-shaped structure. In some embodiments, the density of the part of the suspended film structure 1030 arranged in the inside area of the ring-shaped structure may be greater than the density of the part of the suspended film structure 1030 arranged in the outside area of the ring-shaped structure. The mass of the part of the suspended film structure 1030 arranged in the inside area of the ring-shaped structure may be greater than the mass of the part of the suspended film structure 1030 arranged in the outside area of the ring-shaped structure through changing the density or thickness at different positions of the suspended film structure 1030. When the suspended film structure 1030 and the base structure 1010 move relative to each other, the suspended film structure 1030 close to the ring-shaped structure of the acoustic transducer unit 1020 may be deformed to a greater degree, which may generate greater deformation stress, thereby improving the output electrical signal of the bone conduction microphone 1000.

It should be noted that the shape of the area enclosed by the plurality of holes 10300 may not be limited to the circle shown in FIG. 10, but may also be a semicircle, a ¼ circle, an ellipse, a semi-ellipse, a triangle, a rectangle, and other regular or irregular shapes. The shape of the acoustic transducer unit 1020 may be adaptively adjusted according to the shape of the area enclosed by the plurality of holes 10300. For example, when the shape of the area enclosed by the plurality of holes 10300 is a rectangle, the shape of the acoustic transducer unit 1020 may be a rectangle. A rectangular acoustic transducer unit 1020 may be arranged along the inside or the outside of the rectangle enclosed by the plurality of holes 10300. As another example, when the shape of the area enclosed by the plurality of holes 10300 is a semicircle, the shape of the acoustic transducer unit 1020 may be a semicircle. A semicircle-shaped acoustic transducer unit 1020 may be arranged along the inside or the outside of the rectangle enclosed by the plurality of holes 10300. In some embodiments, the suspended film structure 1030 shown in FIG. 10 may not be configured with holes.

In some embodiments, the bone conduction microphone 1000 may include at least one damping structural layer. The at least one damping structural layer may be arranged on the upper surface, the lower surface, and/or the interior of the laminated structure. The damping structural layer may reduce the Q value of the resonance area while ensuring that the sensitivity of the bone conduction microphone in the non-resonance area is not reduced, so that the frequency response of the bone conduction microphone may be relatively flat in the entire frequency range.

Figure 12:
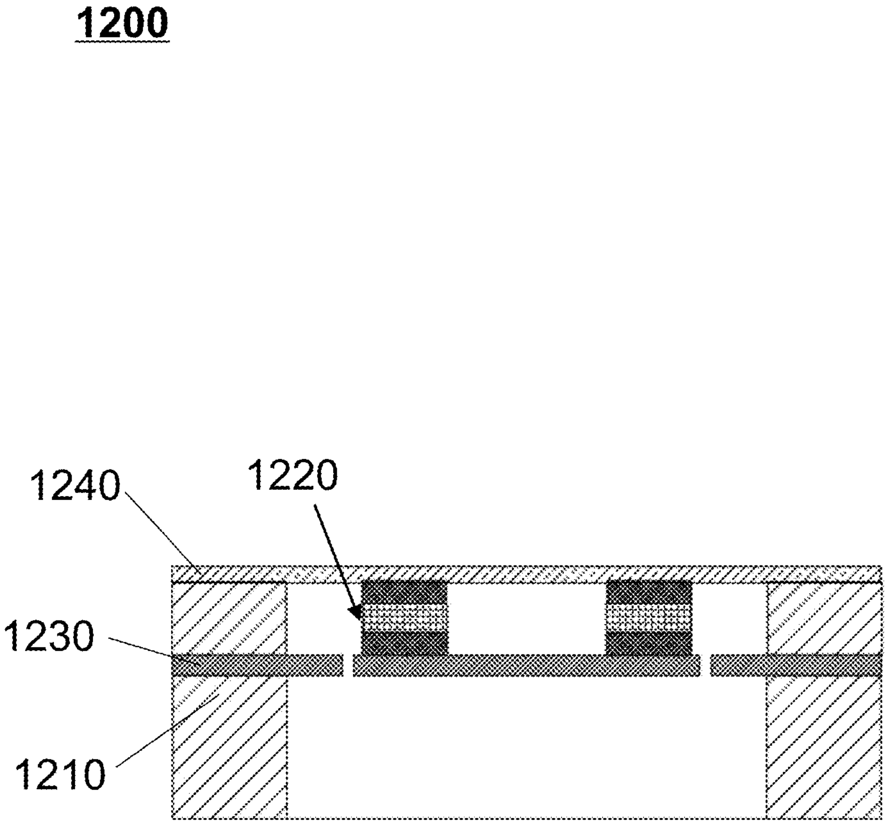
FIG. 12 is a sectional view of a bone conduction microphone according to some embodiments of the present disclosure.

FIG. 12 is a sectional view of a bone conduction microphone according to some embodiments of the present disclosure. As shown in FIG. 12, the bone conduction microphone 1200 may include a base structure 1210, an acoustic transducer unit 1220, a suspended film structure 1230, and a damping structural layer 1240. The peripheral side of the suspended film structure 1230 may be fixedly connected with the base structure 1210, the acoustic transducer unit 1220 may be carried on the suspended film structure 1230, and the damping structural layer 1240 may be arranged on the upper surface of the acoustic transducer unit 1220. In some embodiments, the area of the damping structural layer 1240 may be greater than that of the acoustic transducer unit 1220, so that the damping structural layer 1240 may not only cover the upper surface of the acoustic transducer unit 1220 but also further cover the upper surface of the base structure 1210. In some embodiments, at least part of the peripheral side of the damping structural layer 1240 may be fixed on the base structure 1210.

Figure 13:
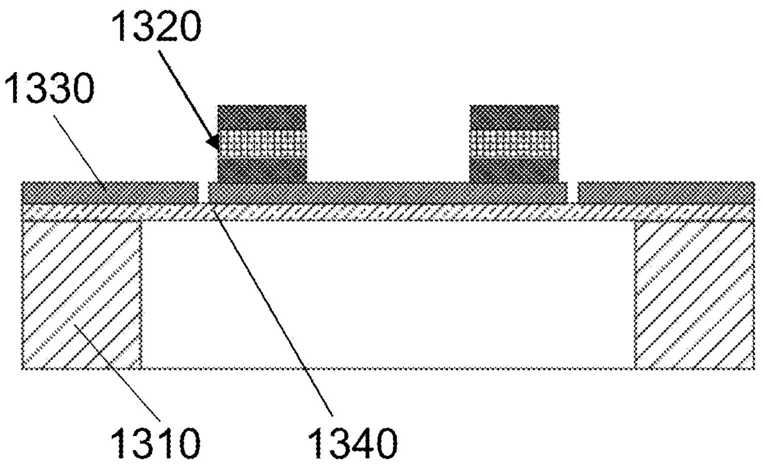
FIG. 13 is a sectional view of a bone conduction microphone according to some embodiments of the present disclosure.

FIG. 13 is a sectional view of a bone conduction microphone according to some embodiments of the present disclosure. As shown in FIG. 13, the bone conduction microphone 1300 may include a base structure 1310, an acoustic transducer unit 1320, a suspended film structure 1330, and a damping structural layer 1340. The peripheral side of the suspended film structure 1330 may be fixedly connected with the base structure 1310, the acoustic transducer unit 1320 may be carried on the suspended film structure 1330, and the damping structural layer 1340 may be arranged on the lower surface of the suspended film structure 1330. In some embodiments, the damping structural layer 1340 may cover the upper surface of the base structure 1310. For example, at least part of the peripheral side of the damping structural layer 1340 may be fixed on the upper surface of the base structure 1310. In some embodiments, the damping structural layer 1340 may also be arranged between the suspended film structure 1330 and the acoustic transducer unit 1320.

Figure 14:
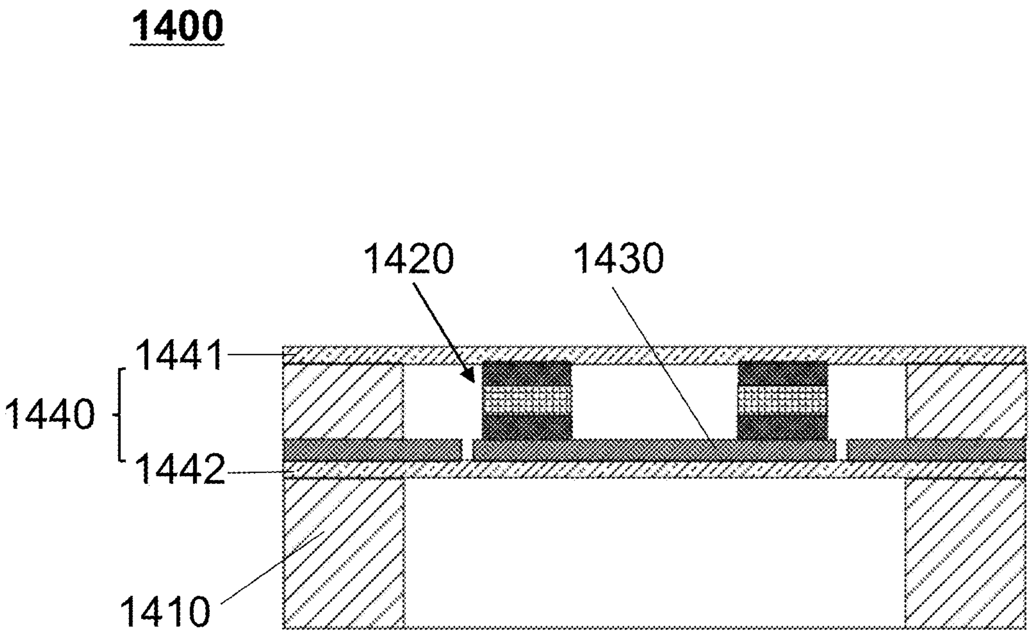
FIG. 14 is a sectional view of a bone conduction microphone according to some embodiments of the present disclosure.

FIG. 14 is a sectional view of a bone conduction microphone according to some embodiments of the present disclosure. As shown in FIG. 14, the bone conduction microphone 1400 may include a base structure 1410, an acoustic transducer unit 1420, a suspended film structure 1430, and two damping structural layers 1440. The two damping structural layers 1440 may include a first damping structural layer 1441 and a second damping structural layer 1442. The peripheral side of the suspended film structure 1430 may be fixedly connected with the base structure 1410, and the acoustic transducer unit 1420 may be carried on the upper surface of the suspended film structure 1430. The first damping structural layer 1441 may be arranged on the upper surface of the acoustic transducer unit 1420, and the second damping structural layer 1442 may be arranged on the lower surface of the suspended film structure 1430. The area of the first damping structural layer 1441 and/or the second damping structural layer 1442 may be greater than that of the acoustic transducer unit 1420, so that the damping structural layer 1440 may not only cover the upper surface of the acoustic transducer unit 1420, but also further cover the upper surface of the base structure 1410. At least part of the peripheral side of the damping structural layer 1440 may be fixed on the base structure 1410. For the embodiments that illustrate two or more damping structural layers, each damping structural layer may be arranged on the upper surface or the lower surface of the laminated structure, or may be arranged at a certain layer in the middle in the thickness direction of the laminated structure. In some embodiments, different damping structural layers may be arranged on the upper surface and the lower surface of the laminated structure, respectively.

It should be noted that the position of the damping structural layer (e.g., the damping structural layer 1240) may not be limited to the upper surface and/or the lower surface of the laminated structure shown in FIG. 12-FIG. 14, but also arranged between a plurality of layered structures of the laminated structure. For example, the damping structural layer may be arranged between the suspended film structure and the electrode layer.

Figure 15:
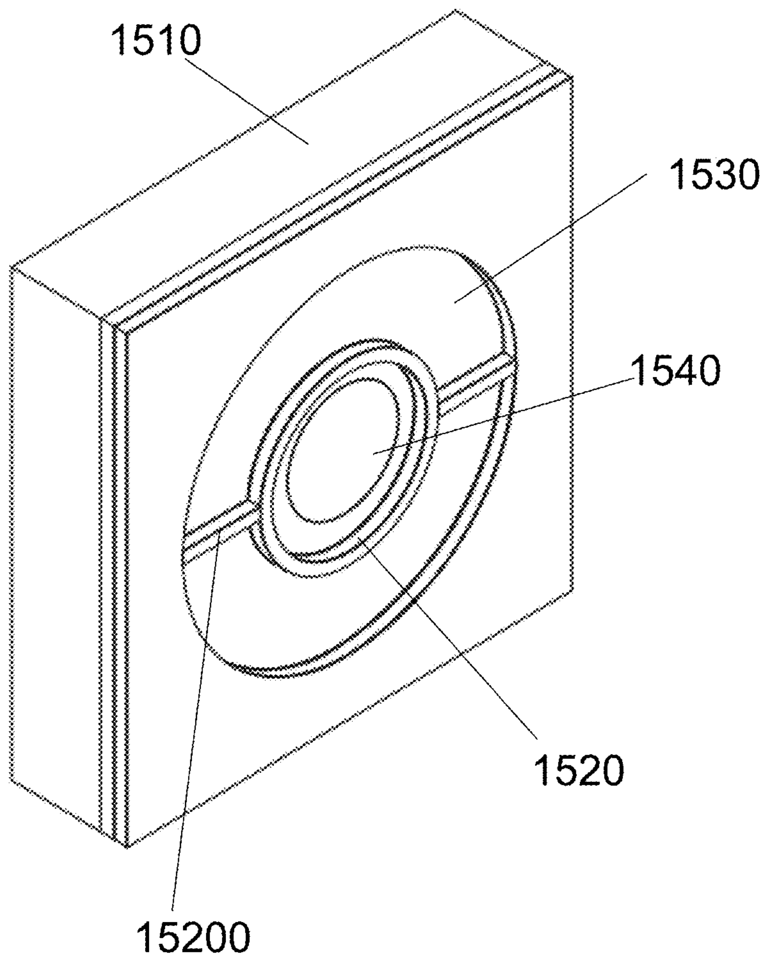
FIG. 15 is a schematic structural diagram of a bone conduction microphone according to some embodiments of the present disclosure.

FIG. 15 is a schematic structural diagram of a bone conduction microphone according to some embodiments of the present disclosure. The structure of the bone conduction microphone 1500 shown in FIG. 15 may be substantially the same as that of the bone conduction microphone 1000 shown in FIG. 10, and the difference may be that the vibration unit of the bone conduction microphone 1500 shown in FIG. 15 may include a suspended film structure 1530 and a mass element 1540. As shown in FIG. 15, the bone conduction microphone 1500 may include a base structure 1510 and a laminated structure, and at least part of the laminated structure may be connected to the base structure 1510. For more details about the base structure 1510, refer to the related descriptions of the base structure 310 shown in FIG. 3, which is not repeated herein.

In some embodiments, the laminated structure may include an acoustic transducer unit 1520 and a vibration unit. In some embodiments, the vibration unit may be arranged on the upper surface or the lower surface of the acoustic transducer unit 1520. As shown in FIG. 15, the vibration unit may include a suspended film structure 1530 and a mass element 1540, and the mass element 1540 may be arranged on the upper surface or the lower surface of the suspended film structure 1530. In some embodiments, the suspended film structure 1530 may be arranged on the upper surface or the lower surface of the base structure 1510. In some embodiments, the peripheral side of the suspended film structure 1530 may also be connected to the inner wall of the hollow part of the base structure 1510. The “connection” herein may be understood as fixing the suspended film structure 1530 to the upper surface and the lower surface of the base structure 1510, or the sidewall of the hollow part of the base structure 1510 by mechanical fixing (e.g., strong bonding, riveting, clipping, inlaying, etc.) after the suspended film structure 1530 and the base structure 1510 are prepared respectively. Alternatively, during the preparation process, the suspended film structure 1530 may be deposited on the base structure 1510 by means of physical deposition (e.g., physical vapor deposition) or chemical deposition (e.g., chemical vapor deposition). When the vibration unit and the base structure 1510 move relative to each other, the weights of the mass element 1540 and the suspended film structure 1530 may be different. The deformation degree of the area that the mass element 1540 is arranged on or close to the suspended film structure 1530 may be greater than the deformation degree of the area far from the mass element 1540 arranged on the suspended film structure 1530. In order to improve the output electrical signal of the bone conduction microphone 1500, the acoustic transducer unit 1520 may be arranged along the circumferential direction of the mass element 1540. In some embodiments, the shape of the acoustic transducer unit 1520 may be the same as or different from the shape of the mass element 1540. In some embodiments, the shape of the acoustic transducer unit 1520 may be the same as that of the mass element 1540, so that each position of the acoustic transducer unit 1520 may be close to the mass element 1540, thereby further improving the output sound pressure of the bone conduction sound transmission device 1500. For example, the mass element 1540 may be a cylindrical-shaped structure, and the acoustic transducer unit 1520 may be a ring-shaped structure. An inner diameter of the acoustic transducer unit 1520 in the ring-shaped structure may be greater than a radius of the mass element 1540, so that the acoustic transducer unit 1520 may be arranged along the circumferential direction of the mass element 1540. In some embodiments, the acoustic transducer unit 1520 may include a first electrode layer and a second electrode layer, and a piezoelectric layer arranged between the two electrode layers. The first electrode layer, the piezoelectric layer, and the second electrode layer may be combined into a structure that fits the shape of the mass element 1540. For example, the mass element 1540 may be the cylindrical-shaped structure, and the acoustic transducer unit 1520 may be the ring-shaped structure. The first electrode layer, the piezoelectric layer, and the second electrode layer may all be ring-shaped structures, which are arranged and combined in order from top to bottom to form the ring-shaped structure.

In some embodiments, the acoustic transducer unit 1520 and the mass element 1540 may be arranged on different sides of the suspended film structure 1530, respectively, or arranged on the same side of the suspended film structure 1530. For example, the acoustic transducer unit 1520 and the mass element 1540 may be arranged on the upper surface or the lower surface of the suspended film structure 1530, and the acoustic transducer unit 1520 may be arranged along the circumferential direction of the mass element 1540. As another example, the acoustic transducer unit 1520 may be arranged on the upper surface of the suspended film structure 1530, and the mass element 1540 may be arranged on the lower surface of the suspended film structure 1530. The projection of the mass element 1540 at the suspended film structure 1530 may be within the area of the acoustic transducer unit 1520.

In some embodiments, the output electrical signal of the bone conduction microphone 1500 may be improved by changing the size, shape, and position of the mass element 1540, as well as the position, shape, and size of the piezoelectric layer. the first electrode layer, the second electrode layer, and the piezoelectric layer of the acoustic transducer unit 1520 may be similar to the structures and parameters of the first electrode layer 1021, the second electrode layer 1023, and the piezoelectric layer 1022 of the acoustic transducer unit 1020 shown in FIG. 10. The structure and parameter of the suspended film structure 1530 may be similar to those of the suspended film structure 1030. The structure of the lead structure 15200 may be similar to the structure of the lead structure 10200, which is not repeated herein.

In some embodiments, the bone conduction microphone 1500 may also include at least one damping structural layer (not shown in FIG. 15), and the at least one damping structural layer may be arranged on the upper surface, the lower surface, and/or inside the laminated structure of the bone conduction microphone 1500. For example, the damping structural layer may be arranged on the upper surface or the lower surface of the laminated structure. As another example, the damping structural layer may be arranged between the suspended film structure 1530 and the acoustic transducer unit 1520. As another example, the damping structural layer may include a first damping structural layer and a second damping structural layer. The first damping structural layer may be arranged on the upper surface of the electrode layer, and the second damping structural layer may be arranged on the lower surface of the suspended film structure 1530. For more details about a material type, Young's modulus of a material, thickness, density, a Poisson's ratio, a loss factor, or the like, of the damping structural layer, refer to the following related descriptions of FIG. 19-FIG. 22.

Figure 16:
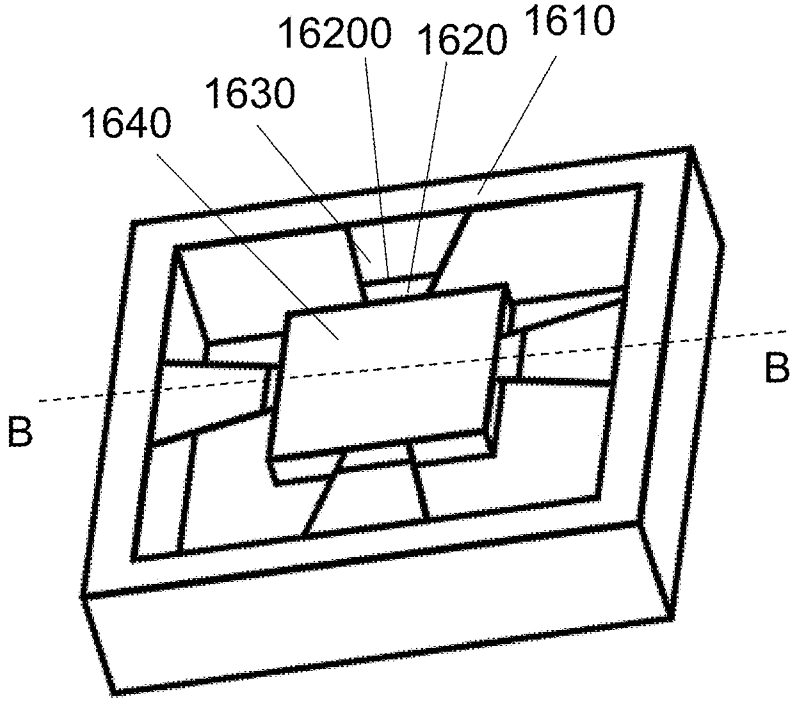
FIG. 16 is a schematic structural diagram of a bone conduction microphone according to some embodiments of the present disclosure.
Figure 17:
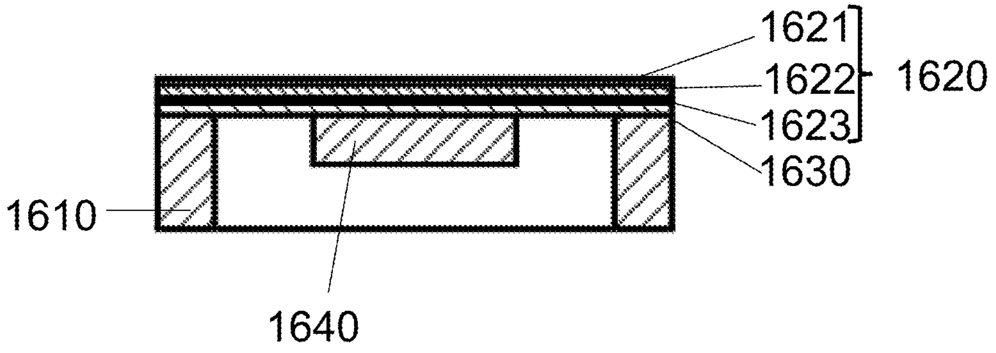
FIG. 17 is a sectional view of a bone conduction microphone at B-B according to some embodiments of the present disclosure.

FIG. 16 is a schematic structural diagram of a bone conduction microphone according to some embodiments of the present disclosure. FIG. 17 is a sectional view of a bone conduction microphone at B-B shown in FIG. 16. As shown in FIG. 16, the base structure 1610 may be a cuboid frame structure. In some embodiments, the interior of the base structure 1610 may include a hollow part, and the hollow part is used to arrange the acoustic transducer unit 1620 and the vibration unit. In some embodiments, the shape of the hollow part may be circular, quadrilateral (e.g., rectangle, parallelogram), pentagon, hexagon, heptagon, octagon, and other regular or irregular shapes. In some embodiments, a dimension of one side of the rectangular cavity may be 0.8 mm-2 mm. In some embodiments, a dimension of one side of the rectangular cavity may be 1 mm-1.5 mm. In some embodiments, the vibration unit may include four support arms 1630 and a mass element 1640. One end of the four support arms 1630 may be connected to the upper surface and the lower surface of the base structure 1610, or the sidewall that the hollow part of the base structure 1610 is arranged, and the other end of the four support arms 1630 may be connected with the upper surface, the lower surface, or the circumferential sidewall of the mass element 1640. In some embodiments, the mass element 1640 may protrude upward and/or downward relative to the support arms 1630. For example, when the ends of the four support arms 1630 are connected with the upper surface of the mass element 1640, the mass element 1640 may protrude downward relative to the support arms 1630. As another example, when the ends of the four support arms 1630 are connected with the lower surface of the mass element 1640, the mass element 1640 may protrude upward relative to the support arms 1630. As another example, when the ends of the four support arms 1630 are connected with the sidewall of the mass element 1640 in the circumferential direction, the mass element 1640 may protrude upward and downward relative to the support arms 1630. In some embodiments, shapes of the support arms 1630 may be trapezoidal. One end of the support arms 1630 with a smaller width may be connected to the mass element 1640, and one end of the support arms 1630 with a greater width may be connected to the base structure 1610.

In some embodiments, the support arms 1630 may include at least one elastic layer. The elastic layer may be a plate-shaped structure made of semiconductor material. In some embodiments, the semiconductor material may include silicon, silicon dioxide, silicon nitride, gallium nitride, zinc oxide, silicon carbide, or the like. In some embodiments, the materials of the different elastic layers of the support arms 1630 may be the same or different. Further, the bone conduction microphone 1600 may include an acoustic transducer unit 1620. The acoustic transducer unit 1620 may include a first electrode layer 1621, a piezoelectric layer 1622, and a second electrode layer 1623 arranged in sequence from top to bottom. The first electrode layer 1621 or the second electrode layer 1623 may be connected with the upper surfaces or the lower surfaces of the support arms 1630 (e.g., the elastic layer). In some embodiments, when the support arms 1630 are a plurality of elastic layers, the acoustic transducer unit 1620 may also be arranged between the plurality of elastic layers. The piezoelectric layer 1622 may generate a voltage (potential difference) under the action of the deformation stress of the vibration unit (e.g., the support arms 1630 and the mass element 1640) based on the piezoelectric effect, and the first electrode layer 1621 and the second electrode layer 1623 may derive the voltage (the electrical signal). In order to make the resonance frequency of the bone conduction microphone 1600 be within a specific frequency range (e.g., 2000 Hz-5000 Hz), the materials and thicknesses of the acoustic transducer unit 1620 (e.g., the first electrode layer 1621, the second electrode layer 1623, and the piezoelectric layer 1622) and the vibration unit (e.g., the support arms 1630) may be adjusted. In some embodiments, the acoustic transducer unit 1620 may further include a wire bonding electrode layer (PAD), and the wire bonding electrode layer may be arranged on the first electrode layer 1621 and the second electrode layer 1623. The first electrode layer 1621 and the second electrode layer 1623 may be communicated with an external circuit by means of external bonding wires (e.g., gold wires, aluminum wires, etc.) to extract the voltage signal between the first electrode layer 1621 and the second electrode layer 1623 to a back-end processing circuit. In some embodiments, the material of the wire bonding electrode layer may include copper foil, titanium, copper, or the like. In some embodiments, the thickness of the wire bonding electrode layer may be 100 nm-200 nm. In some embodiments, the thickness of an outer circuit layer may be 150 nm-200 nm. In some embodiments, the acoustic transducer unit 1620 may further include a seed layer, and the seed layer may be arranged between the second electrode layer 1623 and the support arms 1630. In some embodiments, the material of the seed layer may be the same as the material of the piezoelectric layer 1622. For example, when the material of the piezoelectric layer 1622 is AlN, the material of the seed layer may also be AlN. In some embodiments, the material of the seed layer may also be different from the material of the piezoelectric layer 1622. In some embodiments, the thickness of the seed layer may be 10 nm-120 nm. In some embodiments, the thickness of the seed layer may be 40 nm-80 nm. It should be noted that a specific frequency range of the resonance frequency of the bone conduction microphone 1600 may not be limited to 2000 Hz-5000 Hz, which may also be 4000 Hz-5000 Hz, 2300 Hz-3300 Hz, or the like. The specific frequency range may be adjusted according to an actual situation. In addition, when the mass element 1640 protrudes upward relative to the support arms 1630, the acoustic transducer unit 1620 may be arranged on the lower surfaces of the support arms 1630, and the seed layer may be arranged between the mass element 1640 and the support arms 1630.

In some embodiments, the mass element 1640 may be a single-layer structure or a multi-layer structure. In some embodiments, the mass element 1640 may be the multi-layer structure. The count of layers of the mass element 1640, the materials, and the parameters corresponding to the structure of each layer may be the same as or different from the elastic layers of the support arms 1630 and the acoustic transducer unit 1620. In some embodiments, the shape of the mass element 1640 may be a circle, a semi-circle, an ellipse, a triangle, a quadrilateral, a pentagon, a hexagon, a heptagon, an octagon, and other regular or irregular shapes. In some embodiments, the thickness of the mass element 1640 may be the same as or different from a total thickness of the support arms 1630 and the acoustic transducer unit 1620. For more details about the material and the size of the mass element 1640 in the multi-layer structure, refer to the elastic layers of the support arms 1630 and the acoustic transducer unit 1620, which is not repeated herein. In addition, the materials and the parameters of each layer structure of the elastic layer and the acoustic transducer unit 1620 may also be applied to the bone conduction microphones described in other embodiments of the present disclosure.

In some embodiments, the acoustic transducer unit 1620 may at least include an active acoustic transducer unit. The effective acoustic transducer unit may refer to the part of the structure of the acoustic transducer unit that finally generates the electrical signal. For example, the first electrode layer 1621, the piezoelectric layer 1622, and the second electrode layer 1623 may have the same shape and area, and partially cover the support arms 1630 (the elastic layer). That is, the first electrode layer 1621, the piezoelectric layer 1622, and the second electrode layer 1623 may be effective transducer units. As another example, the first electrode layer 1621 and the piezoelectric layer 1622 may partially cover the support arms 1630, and the second electrode layer 1623 may completely cover the support arms 1630. That is, the first electrode layer 1621, the piezoelectric layer 1622, and the part of the second electrode layer 1623 corresponding to the first electrode layer 1621 may constitute the effective acoustic transducer unit. As another example, the first electrode layer 1621 may partially cover the support arm 1630, and the piezoelectric layer 1622 and the second electrode layer 1623 may all cover the support arm 1630, so that the first electrode layer 1621, the piezoelectric layer 1622 corresponding to the first electrode layer 1621, and the second electrode layer 1623 corresponding to the first electrode layer 1621 may constitute an effective transducer unit. As another example, the first electrode layer 1621, the piezoelectric layer 1622, and the second electrode layer 1623 may all cover the support arm 1630, however, the first electrode layer 1621 may be configured with an insulation groove (e.g., the electrode insulation groove 16200), so that the first electrode layer 1621 may be divided into a plurality of independent electrodes. The independent electrode part of the first electrode layer 1621 that draws out an electrical signal and the corresponding parts of the piezoelectric layer 1622 and the second electrode layer 1623 may be effective transducer units. The independent electrode areas in the first electrode layer 1621 that do not draw out an electrical signal, the independent electrodes of the first electrode layer 1621 that do not draw out an electrical signal, the piezoelectric layers 1622 corresponding to the insulation groove, and the area of the second electrode layer 1623 do not provide the electrical signal, but mainly provide a mechanical action. In order to improve the signal-to-noise ratio of the bone conduction microphone 1600, the effective acoustic transducer unit may be arranged at a position of the support arm 1630 close to the mass element 1640 or close to the connection between the support arm 1630 and the base structure 1610. In some embodiments, the effective acoustic transducer unit may be arranged at a position of the support arm 1630 close to the mass element 1640. In some embodiments, when the effective acoustic transducer unit is arranged at the position of the support arm 1630 close to the mass element 1640 or close to the connection between the support arm 1630 and the base structure 1610, a ratio of a coverage area of the effective acoustic transducer unit at the support arm 1630 to the area of the support arm 1630 may be 5%-40%. In some embodiments, a ratio of a coverage area of the effective acoustic transducer unit at the support arm 1630 to the area of the support arm 1630 may be 10%-35%. In some embodiments, a ratio of a coverage area of the effective acoustic transducer unit at the support arm 1630 to the area of the support arm 1630 may be 15%-20%.

The signal-to-noise ratio of the bone conduction microphone 1600 may be positively related to the strength of the output electrical signal. When the laminated structure moves relative to the base structure, the deformation stress at the connection between the support arm 1630 and the mass element 1640 and at the connection between the support arm 1630 and the base structure 1610 may be greater than the deformation stress at the middle area of the support arm 1630. Correspondingly, the strength of the output voltage at the connection between the support arm 1630 and the mass element 1640 and at the connection between the support arm 1630 and the base structure 1610 may be greater than the strength of the output voltage at the middle area of the support arm 1630. In some embodiments, when the acoustic transducer unit 1620 completely or nearly completely covers the upper surface or the lower surface of the support arm 1630, in order to improve the signal-to-noise ratio of the bone conduction microphone 1600, the electrode insulation groove 16200 may be arranged on the first electrode layer 1621, and the electrode insulation groove 16200 may divide the first electrode layer 1624 into two parts, so that a part of the first electrode layer 1624 may be close to the mass element 1640, and the other part of the first electrode layer 1624 may be close to the connection between the support arm 1630 and the base structure 1610. The first electrode layer 1621, the corresponding piezoelectric layer 1622, and a part, from which the electrical signal is drawn, of the two parts of the second electrode layer 1623 divided by the electrode insulation groove 16200, may be the effective acoustic transducer unit. In some embodiments, the electrode insulation groove 16200 may be a straight line extending along a width direction of the support arm 1630. In some embodiments, the width of the electrode insulation groove 16200 may be 2 um~20 um. In some embodiments, the width of the electrode insulation groove 16200 may be 4 um~10 um.

It should be noted that the electrode insulation groove 16200 is not limited to the straight line extending along the width direction of the support arm 1630, but may also be a curved line, a bent line, a wavy line, or the like. In addition, the electrode insulation groove 16200 may not extend along the width direction of the support arm 1630 (as shown in FIG. 18), and the electrode insulation channel 16200 may only need to be able to divide the acoustic transducer unit 1620 into a plurality of parts, which is not limited herein.

Figure 18:
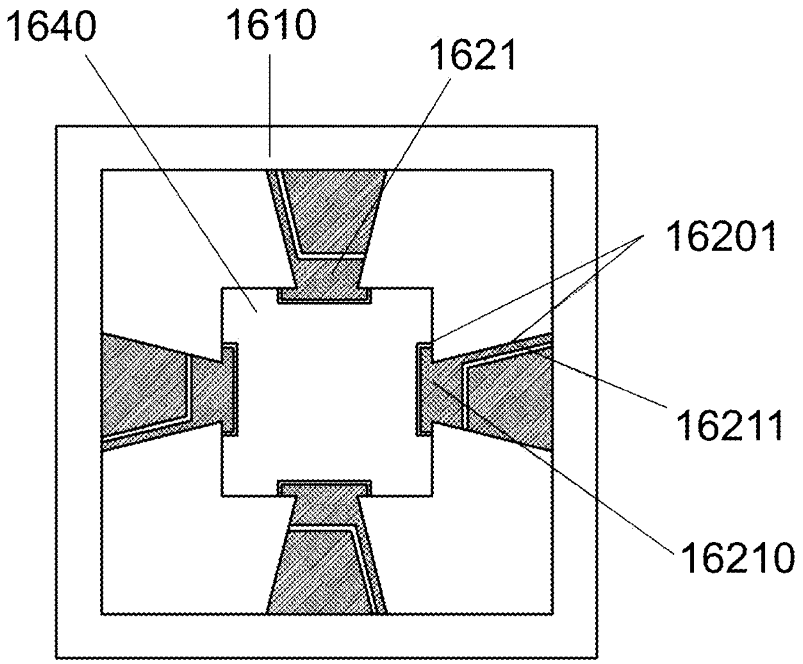
FIG. 18 is a top view of a bone conduction microphone according to some embodiments of the present disclosure.

As shown in FIG. 18, when part of the structure of the acoustic transducer unit 1620 (e.g., the acoustic transducer unit between the electrode insulation groove 16201 and the mass element 1640 in FIG. 18) is arranged at the position of the support arm 1630 close to the mass element 1640, the first electrode layer 1621 and/or the second electrode layer 1623 may further include electrode leads. Taking the first electrode layer 1621 as an example, the electrode insulation groove 16201 may divide the first electrode layer 1621 into two parts. A part of the first electrode layer 1621 may be connected to or close to the mass element 1640, and the other part of the first electrode layer 1621 may be close to the connection between the support arm 1630 and the base structure 1610. In order to output the voltage of the acoustic transducer unit 1620 close to the mass element 1640, the first electrode layer 1621 close to the connection between the support arm 1630 and the base structure 1610 may be divided into a partial area (the first electrode layer 1621 shown in the figure is arranged at the edge area of the support arm 1630) through the electrode insulation groove 16201, and the partial area may electrically connect a part of the acoustic transducer unit 1620 that is connected to or close to the mass element 1640 with a processing unit of the bone conduction microphone 1600. In some embodiments, the width of the electrode lead may be 4 um~20 um. In some embodiments, the width of the electrode lead may be 4 um~10 um. In some embodiments, the electrode lead may be arranged at any position along the width direction of the support arm 1630. For example, the electrode lead may be arranged at the center of the support arm 1630 or close to the edge in the width direction. In some embodiments, the electrode lead may be arranged close to the edge of the support arm 1630 in the width direction. By arranging the electrode lead 16211, guide wires in the acoustic transducer unit 1620 may be avoided to be used, and the structure may be relatively simple, so that subsequent production and assembly may be facilitated.

Considering that the piezoelectric material of the piezoelectric layer 1622 in the area close to the edge of the support arm 1630 may cause surface roughness due to etching, and the quality of the piezoelectric material may deteriorate. In some embodiments, when the area of the piezoelectric layer 1622 is the same as that of the second electrode layer 1623, in order to make the first electrode layer 1621 be arranged in the piezoelectric material area with better quality, the area of the piezoelectric layer 1622 may be smaller than that of the first electrode layer 1621, so that the edge area of the first electrode layer 1621 may avoid the edge area of the piezoelectric layer 1622, and an electrode indentation groove (not shown in the figure) may be formed between the first electrode layer 1621 and the piezoelectric layer 1622. By setting the electrode indentation groove, the areas with poor edge quality of the piezoelectric layer 1622 may be avoided from the first electrode layer 1621 and the second electrode layer 1623, thereby improving the signal-to-noise ratio of the bone conduction microphone. In some embodiments, the width of the electrode indentation groove may be 2 um~20 um. In some embodiments, the width of the electrode indentation groove may be 2 um~10 um.

As shown in FIG. 17 and FIG. 18, taking the mass element 1640 protruding downward relative to the support arm 1630 as an example, the acoustic transducer unit 1620 may further include an extension area 16210 extending along the length of the support arm 1630, and the extension area 16210 may be arranged on the upper surface of the mass element 1640. In some embodiments, the electrode insulation groove 16201 may be arranged at the edge of the extension area 16210 on the upper surface of the mass element 1640 to prevent excessive stress concentration in the support arm 1630, thereby improving the stability of the support arm 1630. In some embodiments, the length of the extension area 16210 may be greater than the width of the support arm 1630. The length of the extension area 16210 may correspond to the width direction of the support arm 1630. In some embodiments, the length of the extension area 16210 may be 4 um~30 um. In some embodiments, the length of the extension area 16210 may be 4 um~15 um. In some embodiments, the length of the extension area 16210 on the mass element 1640 may be 1.2 times to 2 times the width of the edge connection between the support arm 1630 and the mass element 1640. In some embodiments, the length of the extension area 16210 on the mass element 1640 may be 1.2 times to 1.5 times the width of the edge connection between the support arm 1630 and the mass element 1640.

In some embodiments, the bone conduction microphone similar to the bone conduction microphone shown in FIG.

Figure 19:
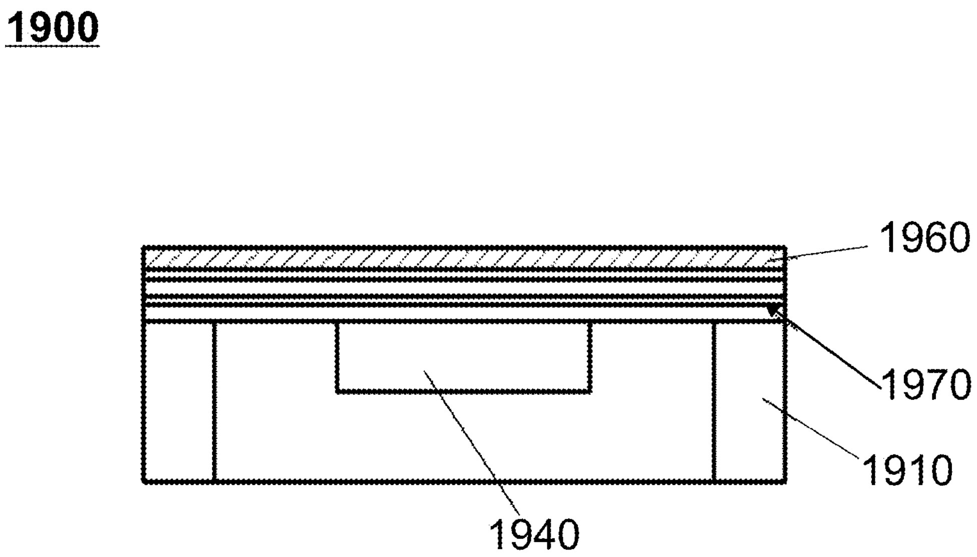
FIG. 19 is a sectional view of a bone conduction microphone according to some embodiments of the present disclosure.

16-FIG. 18 may further include at least one damping structural layer. The at least one damping structural layer may be arranged on the upper surface, the lower surface, or/and inside the laminated structure, and the peripheral side of the at least one damping structural layer may be fixedly connected to the base structure. The damping structural layer may reduce the Q value of the resonance area while ensuring that the sensitivity of the bone conduction microphone in the non-resonance area is not reduced, so that the frequency response of the bone conduction microphone may be relatively flat in the entire frequency range. FIG. 19 is a sectional view of a bone conduction microphone according to some embodiments of the present disclosure. As shown in FIG. 19, the bone conduction microphone 1900 may include a base structure 1910, a laminated structure 1970, and a damping structural layer 1960. Taking a mass element 1940 of the laminated structure 1970 protruding downward relative to the support arm as an example, the damping structural layer 1960 may be arranged on the upper surface of the laminated structure 1970, and the damping structural layer 1960 may cover the entire laminated structure 1970. In some embodiments, the damping structural layer 1960 may also be arranged on the lower surface of the laminated structure 1970. When the damping structural layer is arranged on the lower surface of the laminated structure 1970, since the mass element 1940 protrudes downward relative to the support arm, the shape of the damping structural layer 1960 may be adapted to the lower surface of the laminated structure 1970 to fit and cover the lower surface of the laminated structure 1970. In some embodiments, the damping structural layer 1960 may also be arranged between a plurality of layers of the laminated structure 1970. For example, the damping structural layer 1960 may be arranged between the mass element of the laminated structure 1970 and the second electrode layer.

The laminated structure of the bone conduction microphone may be regarded as a spring-mass system approximately. Bone conduction microphones with different structures may be different spring-mass systems. Compared with the bone conduction microphone without the mass element (e.g., the bone conduction microphone 300 shown in FIG. 3, the bone conduction microphone 900 shown in FIG. 9, and the bone conduction microphone 1000 shown in FIG. 10), the equivalent spring stiffness and the equivalent mass of the bone conduction microphone with the mass element (e.g., the bone conduction microphone 1500 shown in FIG. 15, the bone conduction microphone 1600 shown in FIG. 16, and the bone conduction microphone 1900 shown in FIG. 19) may be greater. Therefore, when the damping structural layer is arranged, for the bone conduction microphone with the mass element, a greater Young's modulus or a thicker damping structural layer may be required to achieve a better effect.

In some embodiments, for a single-layer damping structural layer bone conduction microphone with a mass element (e.g., the bone conduction microphone 1500 shown in FIG. 15, the bone conduction microphone 1600 shown in FIG. 16, and the bone conduction microphone 1900 shown in FIG. 19), the material of the damping structural layer may have a greater Young's modulus. For example, in the case of the damping structural layer with the greater Young's modulus material, the Young's modulus of the material of the damping structural layer may be in a range of $10^9$ Pa~$10^{10}$ Pa. In some embodiments, the Young's modulus of the material of the damping structural layer may be in a range of $10^9$ Pa~$0.9\times10^{10}$ Pa. In some embodiments, the Young's modulus of the material of the damping structural layer may be in a range of $0.2\times10^{10}$ Pa~$0.8\times10^{10}$ Pa. In some embodiments, the Young's modulus of the material of the damping structural layer may be in a range of $0.3\times10^{10}$ Pa~$0.7\times10^{10}$ Pa. In some embodiments, the Young's modulus of the material of the damping structural layer may be in a range of $0.4\times10^{10}$ Pa~$0.6\times10^{10}$ Pa. In some embodiments, the density of the material of the damping structural layer may be $1.1\times10^3$ kg/m$^3$~$2\times10^3$ kg/m$^3$. In some embodiments, the density of the material of the damping structural layer may be $1.2\times10^3$ kg/m$^3$~$1.9\times10^3$ kg/m$^3$. In some embodiments, the density of the material of the damping structural layer may be $1.3\times10^3$ kg/m$^3$~$1.8\times10^3$ kg/m$^3$. In some embodiments, the density of the material of the damping structural layer may be $1.4\times10^3$ kg/m$^3$~$1.7\times10^3$ kg/m$^3$. In some embodiments, the density of the material of the damping structural layer may be $1.5\times10^3$ kg/m$^3$~$1.6\times10^3$ kg/m$^3$. In some embodiments, the Poisson's ratio of the material of the damping structural layer may be 0.4~0.5. In some embodiments, the Poisson's ratio of the material of the damping structural layer may be 0.41~0.49. In some embodiments, the Poisson's ratio of the material of the damping structural layer may be 0.42~0.48. In some embodiments, the Poisson's ratio of the material of the damping structural layer may be 0.43~0.47. In some embodiments, the Poisson's ratio of the material of the damping structural layer may be 0.44~0.46. In some embodiments, the thickness of the damping structural layer may be 0.1 um~5 um. In some embodiments, the thickness of the damping structural layer may be 0.2 um~4.5 um. In some embodiments, the thickness of the damping structural layer may be 0.3 um~4 um. In some embodiments, the thickness of the damping structural layer may be 0.4 um~3.5 um. In some embodiments, the thickness of the damping structural layer may be 0.5 um~3 um.

Figure 20:
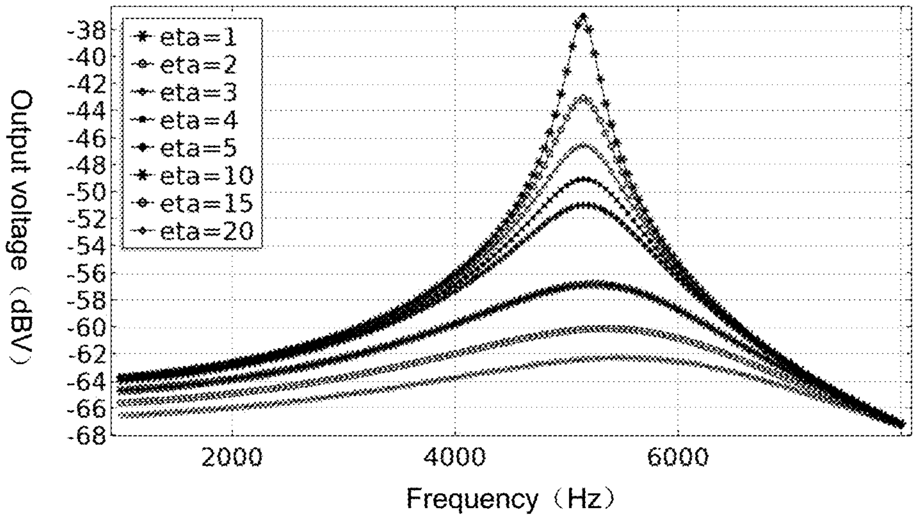
FIG. 20 is a frequency response curve of an output voltage of a bone conduction microphone according to some embodiments of the present disclosure.

FIG. 20 is a diagram illustrating a frequency response of an output voltage of a bone conduction microphone with a damping structural layer having a greater Young's modulus according to FIG. 19. As shown in FIG. 20, eta refers to an isotropic structural loss factor of the material of the damping structural layer of the bone conduction microphone shown in FIG. 19, the abscissa is the frequency (Hz), and the ordinate is the output voltage (dBV) of a device. It may be seen from FIG. 20 that when the thickness of the damping structural layer is constant, the isotropic structural loss factor of the material of the damping structural layer may be 1~20. When the loss factor of the material of the damping structural layer is 1, a peak value of the output voltage in the resonance area (e.g., 2000 Hz~6000 Hz) may be greater. As the loss factor of the material of the damping structural layer increases, the peak value of the output voltage of the bone conduction microphone in the resonance area may gradually decrease. In some embodiments, the isotropic structural loss factor of the material of the damping structural layer may be 1~20. In some embodiments, the isotropic structural loss factor of the material of the damping structural layer may be 2~18. In some embodiments, the isotropic structural loss factor of the material of the damping structural layer may be 3~16. In some embodiments, the isotropic structural loss factor of the material of the damping structural layer may be 4~15. In some embodiments, the isotropic structural loss factor of the material of the damping structural layer may be 5~10. In some embodiments, the isotropic structural loss factor of the material of the damping structural layer may be 6~9.

In some embodiments, for a single-layer damping structural layer bone conduction microphone with a mass element (e.g., the bone conduction microphone 1500 shown in FIG. 15, the bone conduction microphone 1600 shown in FIG. 16, and the bone conduction microphone 1900 shown in FIG.

19), the thickness of the damping structural layer may be greater. In some embodiments, the thickness of the damping structural layer may be 5 um~80 um. In some embodiments, the thickness of the damping structural layer may be 10 um~75 um. In some embodiments, the thickness of the damping structural layer may be 15 um~70 um. In some embodiments, the thickness of the damping structural layer may be 20 um~65 um. In some embodiments, the thickness of the damping structural layer may be 25 um~60 um. In some embodiments, the thickness of the damping structural layer may be 30 um~55 um. In some embodiments, the thickness of the damping structural layer may be 40 um~50 um.

When a thicker damping structural layer is arranged, the Young's modulus of the damping structural layer may be smaller. For example, in the case of the thick damping structural layer mentioned above, the Young's modulus of the material of the damping structural layer may be in a range of $10^6$ Pa~$10^7$ Pa. In some embodiments, the Young's modulus of the material the damping structural layer may be in a range of $10^6$ Pa~$0.8\times10^7$ Pa. In some embodiments, the Young's modulus of the material of the damping structural layer may be in a range of $0.2\times10^7$ Pa~$0.6\times10^7$ Pa. In some embodiments, the density of the material of the damping structural layer may be in a range of $0.7\times10^3$ kg/m$^3$~$1.2\times10^3$ kg/m$^3$. In some embodiments, the density of the material of the damping structural layer may be in a range of $0.75\times10^3$ kg/m$^3$~$1.15\times10^3$ kg/m$^3$. In some embodiments, the density of the material of the damping structural layer may be in a range of $0.8\times10^3$ kg/m$^3$~$1.1\times10^3$ kg/m$^3$. In some embodiments, the density of the material of the damping structural layer may be in a range of $0.85\times10^3$ kg/m$^3$~$1.05\times10^3$ kg/m$^3$. In some embodiments, the density of the material of the damping structural layer may be in a range of $0.9\times10^3$ kg/m$^3$~$1\times10^3$ kg/m$^3$. In some embodiments, the Poisson's ratio of the material of the damping structural layer may be 0.4~0.5. In some embodiments, the Poisson's ratio of the material of the damping structural layer may be 0.41~0.49. In some embodiments, the Poisson's ratio of the material of the damping structural layer may be 0.42~0.48. In some embodiments, the Poisson's ratio of the material of the damping structural layer may be 0.43~0.47. In some embodiments, the Poisson's ratio of the material of the damping structural layer may be 0.44~0.46.

Figure 21:
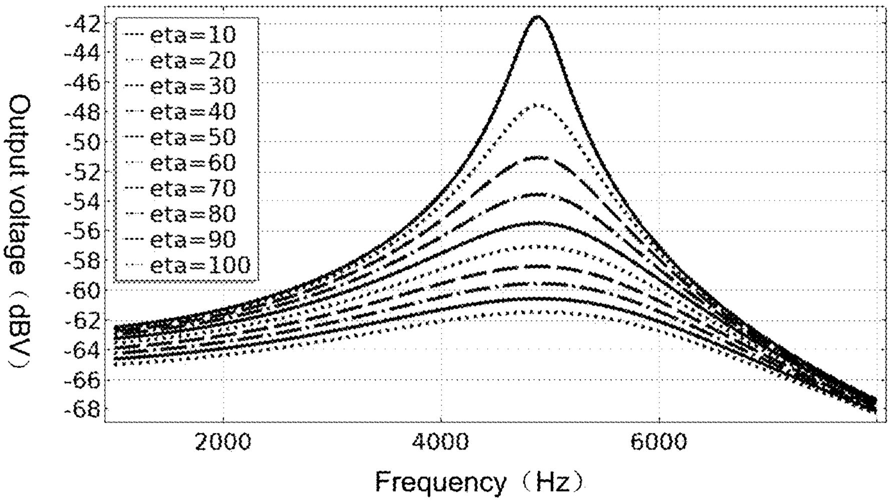
FIG. 21 is a frequency response curve of an output voltage of a bone conduction microphone according to some embodiments of the present disclosure.

FIG. 21 is a frequency response curve of an output voltage of a bone conduction microphone with a damping structural layer having a greater thickness according to FIG. 19. As shown in FIG. 21, eta refers to an isotropic structural loss factor of the material of the damping structural layer of the bone conduction microphone shown in FIG. 19, the abscissa is the frequency (Hz), and the ordinate is the output voltage (dBV) of a device. It may be seen from FIG. 21 that in the case that the bone conduction microphone has a damping structural layer with a greater thickness (the thickness of the damping structural layer is constant herein), when the isotropic structural loss factor of the material of the damping structural layer is 10~100 and the loss factor of the material of the damping structural layer is 10, a peak value of the output voltage in the resonance area (2000 Hz~6000 Hz) may be greater. When the loss factor of the material of the damping structural layer is 100, the peak value of the output voltage in the resonance area may be small. As the loss factor of the material of the damping structural layer increases, the peak value of the output voltage of the bone conduction microphone in the resonance area may gradually decrease. In some embodiments, when the bone conduction microphone has a damping structural layer with a greater thickness, the isotropic structural loss factor of the material of the damping structural layer may be 10~80. In some embodiments, the isotropic structural loss factor of the material of the damping structural layer may be 15~75. In some embodiments, the isotropic structural loss factor of the material of the damping structural layer may be 20~70. In some embodiments, the isotropic structural loss factor of the material of the damping structural layer may be 25~65. In some embodiments, the isotropic structural loss factor of the material of the damping structural layer may be 30~60. In some embodiments, the isotropic structural loss factor of the material of the damping structural layer may be 20~40.

Figure 22:
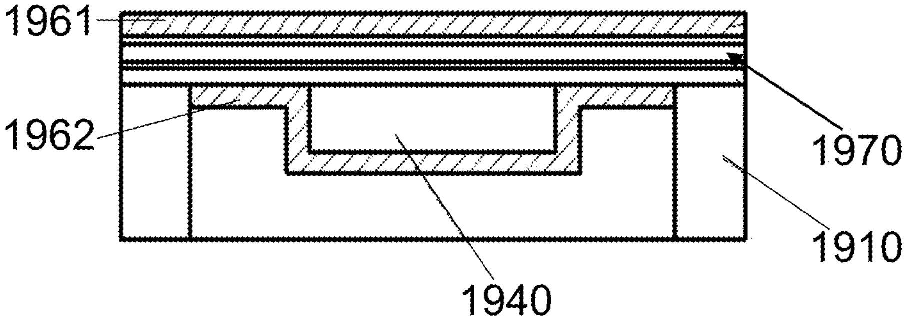
FIG. 22 is a sectional view of a bone conduction microphone with two damping structural layers according to some embodiments of the present disclosure.

FIG. 22 is a sectional view of a bone conduction microphone according to some embodiments of the present disclosure. An overall structure of the bone conduction microphone shown in FIG. 22 may be substantially the same as that of the bone conduction microphone shown in FIG. 19, and the difference may be that the bone conduction microphone shown in FIG. 22 may have two damping structural layers. As shown in FIG. 22, the bone conduction microphone may include a base structure 1910, a laminated structure 1970, a first damping structural layer 1961, and a second damping structural layer 1962. Taking the mass element 1940 of the laminated structure 1970 protruding downward relative to the support arm as an example, the first damping structural layer 1961 may be arranged on the upper surface of the laminated structure 1970, the first damping structural layer 1961 may cover the entire laminated structure 1970, the second damping structural layer 1962 may be arranged on the lower surface of the laminated structure 1970, and the second damping structural layer 1962 may cover the lower surface of the laminated structure 1970. When the second damping structural layer 1962 is arranged on the lower surface of the laminated structure 1970, since the mass element 1940 protrudes downward relative to the support arm, the shape of the second damping structural layer 1962 may be adapted to the lower surface of the laminated structure 1970 to fit and cover the lower surface of the laminated structure 1970. That is, the second damping structural layer 1962 may be a stepped structure, a part of the stepped structure may cover the lower surface of the mass element 1940, and the other part may cover the lower surface of the support arm.

In some embodiments, when the bone conduction microphone including the mass element has two damping structural layers, the damping structural layers may use a material with a greater Young's modulus. For example, in the case of the damping structural layer of the material with greater Young's modulus, the Young's modulus of the material of the damping structural layer may be in a range of $10^9$ Pa~$10^{10}$ Pa. In some embodiments, the Young's modulus of the material of the damping structural layer may be in a range of $10^9$ Pa~$0.8\times10^{10}$ Pa. In some embodiments, the Young's modulus of the material of the damping structural layer may be in a range of $0.2\times10^{10}$ 10 Pa~$0.6\times10^{10}$ Pa. In some embodiments, the Young's modulus of the material of the damping structural layer may be in a range of $0.4\times10^{10}$ Pa~$0.6\times10^{10}$ Pa. In some embodiments, the density of the material of the damping structural layer may be $1.1\times10^3$ kg/m$^3$~$2\times10^3$ kg/m$^3$. In some embodiments, the density of the material of the damping structural layer may be $1.2\times10^3$ kg/m$^3$~$1.9\times10^3$ kg/m$^3$. In some embodiments, the density of the material of the damping structural layer may be $1.3\times10^3$ kg/m$^3$~$1.8\times10^3$ kg/m$^3$. In some embodiments, the density of the material of the damping structural layer may be $1.4\times10^3$ kg/m$^3$~$1.7\times10^3$ kg/m$^3$. In some embodiments, the Poisson's ratio of the material of the damping structural layer may be 0.4~0.5. In some embodiments, the Poisson's ratio of the material of the damping structural layer may be 0.41~0.49. In some embodiments, the Poisson's ratio of the material of the damping structural layer may be 0.42~0.48. In some embodiments, the Poisson's ratio of the material of the damping structural layer may be 0.43~0.47. In some embodiments, the Poisson's ratio of the material of the damping structural layer may be 0.44~0.46. In some embodiments, the thickness of each damping structural layer may be 0.1 um~10 um. In some embodiments, the thickness of each damping structural layer may be 0.1 um~3 um. In some embodiments, the thickness of each damping structural layer may be 0.12 um~2.9 um. In some embodiments, the thickness of each damping structural layer may be 0.14 um~2.7 um. In some embodiments, the thickness of each damping structural layer may be 0.16 um~2.5 um. In some embodiments, the thickness of each damping structural layer may be 0.18 um~2.3 um. In some embodiments, the thickness of each damping structural layer may be 0.2 um~2 um. In some embodiments, the isotropic structural loss factor of the material of each damping structural layer may be 1~10. In some embodiments, the isotropic structural loss factor of the material of each damping structural layer may be 2~9. In some embodiments, the isotropic structural loss factor of the material of each damping structural layer may be 3~7. In some embodiments, the isotropic structural loss factor of the material of each damping structural layer may be 5~10. In some embodiments, the isotropic structural loss factor of the material of each damping structural layer may be 6~8.

In some embodiments, when the bone conduction microphone including the mass element has two damping structural layers, the thickness of the damping structural layer may be greater, and the Young's modulus of the material of the damping structural layer may be smaller. In some embodiments, the Young's modulus of the material of the damping structural layer may be in a range of $10^6$ Pa~$10^7$ Pa. In some embodiments, the Young's modulus of the material of the damping structural layer may be in a range of $0.2\times10^7$ Pa~$0.8\times10^7$ Pa. In some embodiments, the Young's modulus of the material of the damping structural layer may be in a range of $0.4\times10^7$ Pa~$0.8\times10^7$ Pa. In some embodiments, the density of the material of the damping structural layer may be $0.7\times10^3$ kg/m$^3$~$1.2\times10^3$ kg/m$^3$. In some embodiments, the density of the material of the damping structural layer may be $0.75\times10^3$ kg/m$^3$~$1.15\times10^3$ kg/m$^3$. In some embodiments, the density of the material of the damping structural layer may be $0.8\times10^3$ kg/m$^3$~$1.1\times10^3$ kg/m$^3$. In some embodiments, the density of the material of the damping structural layer may be $0.85\times10^3$ kg/m$^3$~$1.05\times10^3$ kg/m$^3$. In some embodiments, the density of the material of the damping structural layer may be $0.9\times10^3$ kg/m$^3$~$1\times10^3$ kg/m$^3$. In some embodiments, the Poisson's ratio of the material of the damping structural layer may be 0.4~0.5. In some embodiments, the Poisson's ratio of the material of the damping structural layer may be 0.41~0.49. In some embodiments, the Poisson's ratio of the material of the damping structural layer may be 0.42~0.48. In some embodiments, the Poisson's ratio of the material of the damping structural layer may be 0.43~0.47. In some embodiments, the Poisson's ratio of the material of the damping structural layer may be 0.44~0.46.

In some embodiments, the thickness of each damping structural layer may be 2 um~50 um. In some embodiments, the thickness of each damping structural layer may be 5 um~45 um. In some embodiments, the thickness of each damping structural layer may be 10 um~40 um. In some embodiments, the thickness of each damping structural layer may be 10 um~30 um. In some embodiments, the thickness of each damping structural layer may be 2 um~30 um. In some embodiments, the thickness of each damping structural layer may be 15 um~20 um. In some embodiments, the isotropic structural loss factor of the material of each damping structural layer may be 10~80. In some embodiments, the isotropic structural loss factor of the material of each damping structural layer may be 15~75. In some embodiments, the isotropic structural loss factor of the material of each damping structural layer may be 20~70. In some embodiments, the isotropic structural loss factor of the material of each damping structural layer may be 35~60. In some embodiments, the isotropic structural loss factor of the material of each damping structural layer may be 30~50.

Figure 23:
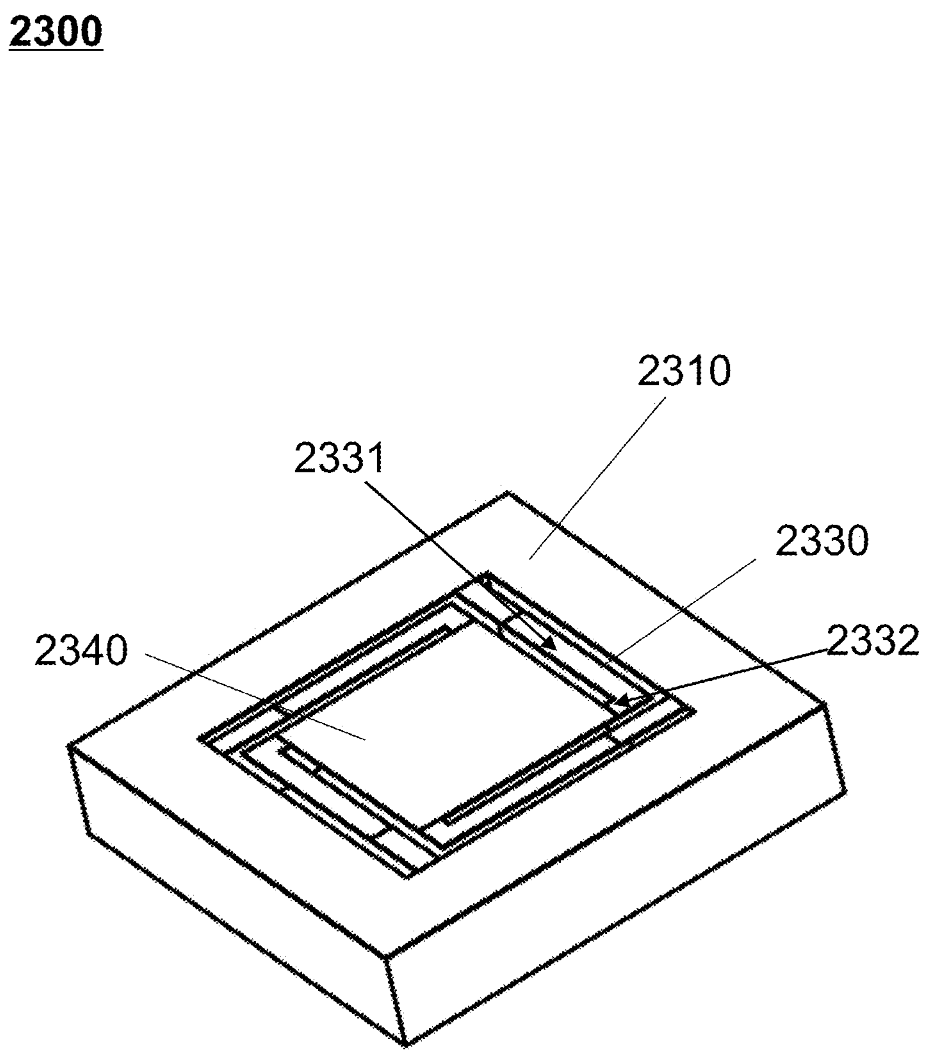
FIG. 23 is a schematic structural diagram of a bone conduction microphone according to some embodiments of the present disclosure.

FIG. 23 is a schematic structural diagram of a bone conduction microphone according to some embodiments of the present disclosure. The structure of the bone conduction microphone 2300 shown in FIG. 23 may be substantially the same as that of the bone conduction microphone 1600 shown in FIG. 16, and the difference may be that the structure of the support arm 2330 of the bone conduction microphone 2300 is different from that of the support arm 1630 of the bone conduction microphone 1600. In some embodiments, the mass element 2340 may protrude upward and/or downward relative to the support arm 2330. In some embodiments, as shown in FIG. 23, the upper surface of the mass element 2340 and the upper surface of the support arm 2330 may be at the same level, and/or the lower surface of the mass element 2340 and the lower surface of the support arm 2330 may be at the same level. In some embodiments, the shape of the support arm 2330 may be an approximately L-shaped structure. As shown in FIG. 23, the support arm 2330 may include a first support arm 2331 and a second support arm 2332. One end of the first support arm 2331 may be connected to one end of the second support arm 2332, and the first support arm 2331 and the second support arm 2332 may have a certain angle. In some embodiments, the angle may be in a range of 75°~105°. In some embodiments, one end of the first support arm 2331 away from the connection between the first support arm 2331 and the second support arm 2332 may be connected to the base structure 2310. One end of the second support arm 2332 away from the connection between the first support arm 2331 and the second support arm 2332 may be connected to the upper surface, the lower surface, or the peripheral sidewall of the mass element 2340, and the mass element 2340 may be suspended in the hollow part of the base structure 2310.

Figure 24:
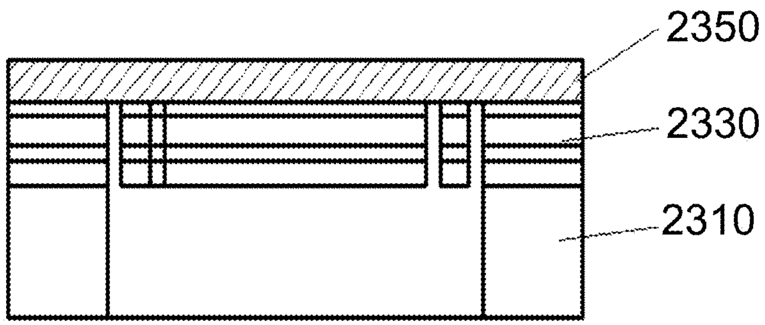
FIG. 24 is a sectional view of a bone conduction microphone according to some embodiments of the present disclosure.

In some embodiments, the bone conduction microphone 2300 may include at least one damping structural layer 2350. The damping structural layer 2350 may be arranged on the upper surface of the laminated structure, or may be arranged on the lower surface of the laminated structure. In some embodiments, the damping structural layer 2350 may be arranged on the upper surface of the laminated structure. FIG. 24 is a sectional view of a bone conduction microphone with a damping structural layer arranged on an upper surface of the bone conduction microphone shown in FIG. 23. The damping structural layer 2350 may be arranged on the upper surfaces of the support arm 2330 and the mass element 2340, and the damping structural layer 2350 may cover the entire surface. In some embodiments, the damping structural layer 2350 may also be arranged on the lower surface of the laminated structure.

In some embodiments, the bone conduction microphone 2300 may have a single-layer damping structural layer, and the Young's modulus of the material of the damping structural layer may be in a range of $10^6$ Pa~$10^{10}$ Pa. In some embodiments, the Young's modulus of the material of the damping structural layer may be in a range of $10^6$ Pa~$10^9$ Pa. In some embodiments, the Young's modulus of the material of the damping structural layer may be in a range of $10^6$ Pa~$10^8$ Pa. In some embodiments, the Young's modulus of the material of the damping structural layer may be in a range of $10^6$ Pa~$10^7$ Pa. In some embodiments, the density of the material of the damping structural layer may be $0.7\times10^3$ kg/m$^3$~$2\times10^3$ kg/m$^3$. In some embodiments, the density of the material of the damping structural layer may be $0.7\times10^3$ kg/m$^3$~$2\times10^3$ kg/m$^3$. In some embodiments, the density of the material of the damping structural layer may be $0.8\times10^3$ kg/m$^3$~$1.9\times10^3$ kg/m$^3$. In some embodiments, the density of the material of the damping structural layer may be $0.9\times10^3$ kg/m$^3$~$1.8\times10^3$ kg/m$^3$. In some embodiments, the density of the material of the damping structural layer may be $1\times10^3$ kg/m$^3$~$1.6\times10^3$ kg/m$^3$. In some embodiments, the density of the material of the damping structural layer may be $1.2\times10^3$ kg/m$^3$~$1.4\times10^3$ kg/m$^3$. In some embodiments, the Poisson's ratio of the material of the damping structural layer may be 0.4~0.5. In some embodiments, the Poisson's ratio of the material of the damping structural layer may be 0.41~0.49. In some embodiments, the Poisson's ratio of the material of the damping structural layer may be 0.42~0.48. In some embodiments, the Poisson's ratio of the material of the damping structural layer may be 0.43~0.47. In some embodiments, the Poisson's ratio of the material of the damping structural layer may be 0.44~0.46. In some embodiments, the thickness of the damping structural layer may be 0.1 um~10 um. In some embodiments, the thickness of the damping structural layer may be 0.1 um~5 um. In some embodiments, the thickness of the damping structural layer may be 0.2 um~4.5 um. In some embodiments, the thickness of the damping structural layer may be 0.3 um~4 um. In some embodiments, the thickness of the damping structural layer may be 0.4 um~3.5 um. In some embodiments, the thickness of the damping structural layer may be 0.5 um~3 um. In some embodiments, the thickness of the damping structural layer may be 0.6 um~2.5 um. In some embodiments, the thickness of the damping structural layer may be 0.7 um~2 um.

Figure 25:
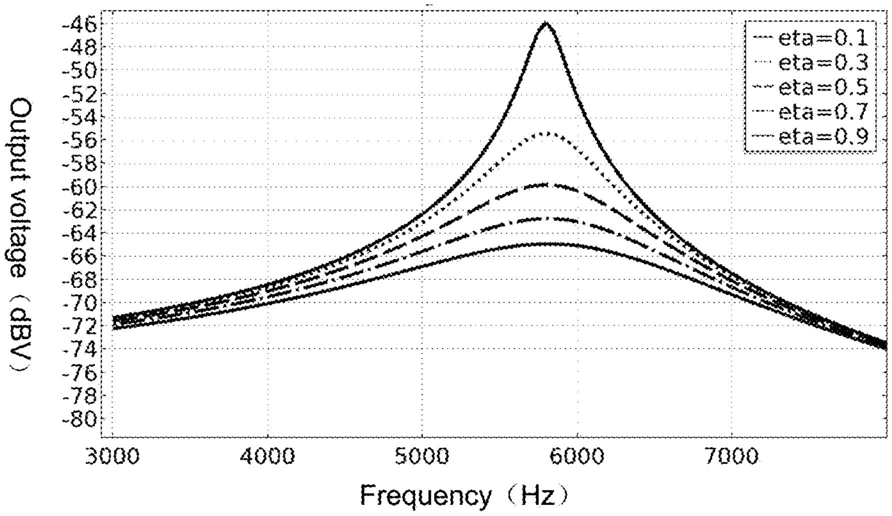
FIG. 25 is a frequency response curve of an output voltage of a bone conduction microphone according to some embodiments of the present disclosure.

FIG. 25 is a frequency response curve of an output voltage of a bone conduction microphone shown in FIG. 24. As shown in FIG. 25, eta refers to the isotropic structural loss factor of the material of the damping structural layer of the bone conduction microphone shown in FIG. 24, the abscissa is the frequency (Hz), and the ordinate is the output voltage (dBV) of the bone conduction microphone. It may be seen from FIG. 25 that when the thickness of the damping structural layer is constant and the loss factor of the material of the damping structural layer is 0.1, the peak value of the output voltage in the resonance area (e.g., 3000 Hz~7000 Hz) may be large. When the loss factor of the material of the damping structural layer is 0.9, the peak value of the output voltage in the resonance area may be small. As the loss factor of the material of the damping structural layer increases, the peak value of the output voltage of the bone conduction microphone in the resonance area may gradually decrease. In some embodiments, a bone conduction microphone similar to that shown in FIG. 24 may have a single damping structural layer, and the isotropic structural loss factor of the material of the damping structural layer may be 0.1~2. In some embodiments, the isotropic structural loss factor of the material of the damping structural layer may be 0.2~1.9. In some embodiments, the isotropic structural loss factor of the material of the damping structural layer may be 0.3~1.7. In some embodiments, the isotropic structural loss factor of the material of the damping structural layer may be 0.4~1.5. In some embodiments, the isotropic structural loss factor of the material of the damping structural layer may be 0.5~1.2. In some embodiments, the isotropic structural loss factor of the material of the damping structural layer may be 0.7~1.

Figure 26:
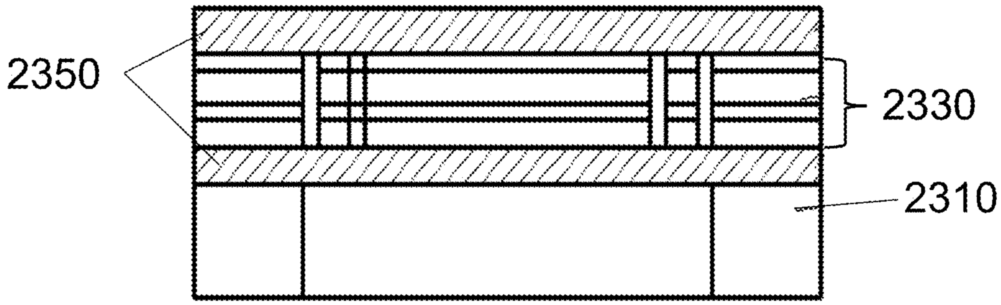
FIG. 26 is a sectional view of a bone conduction microphone with two damping structural layers according to some embodiments of the present disclosure.

FIG. 26 is a sectional view of a bone conduction microphone with two damping structural layers shown in FIG. 23. A damping structural layer 2350 may be arranged on the upper surface and the lower surfaces of the support arm 2330 and the mass element 2340. The lower damping structural layer 2350 may cover the entire lower surface of the laminated structure and may be connected with the base structure 2310. The upper damping structure layer 2350 may cover the entire upper surface of the laminated structure. In some embodiments, the damping structural layer 2350 may also be arranged in a gap between two layers of the laminated structure. For example, the damping structural layer 2350 may also be arranged between the electrode layer and the elastic layer. In some embodiments, the damping structural layer may also be arranged between the support arm and the acoustic transducer unit. Alternatively, the damping structural layer may be arranged between the vibration unit and the acoustic transducer unit.

In some embodiments, a bone conduction microphone similar to that shown in FIG. 26 may have two damping structural layers, and the Young's modulus of the material of the damping structural layer may be in a range of $10^6$ Pa~$10^7$ Pa. In some embodiments, the Young's modulus of the material of the damping structural layer may be in a range of $10^6$ Pa~$0.8\times10^7$ Pa. In some embodiments, the Young's modulus of the material of the damping structural layer may be in a range of $0.2\times10^6$ Pa~$0.6\times10^7$ Pa. In some embodiments, the density of the material of the damping structural layer may be $0.7\times10^3$ kg/m$^3$~$1.2\times10^3$ kg/m$^3$. In some embodiments, the density of the material of the damping structural layer may be $0.75\times10^3$ kg/m$^3$~$1.1\times10^3$ kg/m$^3$. In some embodiments, the density of the material of the damping structural layer may be $0.8\times10^3$ kg/m$^3$~$1\times10^3$ kg/m$^3$. In some embodiments, the density of the material of the damping structural layer may be $0.85\times10^3$ kg/m$^3$~$0.9\times10^3$ kg/m$^3$. In some embodiments, the Poisson's ratio of each damping structural layer material may be 0.4~0.5. In some embodiments, the Poisson's ratio of each damping structural layer material may be 0.41~0.49. In some embodiments, the Poisson's ratio of each damping structural layer material may be 0.42~0.48. In some embodiments, the Poisson's ratio of each damping structural layer material may be 0.43~0.47. In some embodiments, the Poisson's ratio of each damping structural layer material may be 0.44~0.46. In this case, the thickness of each damping structural layer may be slightly smaller than the thickness of the damping structural layer of the bone conduction microphone with only a single damping structural layer. For example, the thickness of each damping structural layer material may be 0.1 um~3 um. In some embodiments, the thickness of each damping structural layer material may be 0.12 um~2.9 um. In some embodiments, the thickness of each damping structural layer material may be 0.14 um~2.8 um. In some embodiments, the thickness of each damping structural layer material may be 0.16 um~2.7 um. In some embodiments, the thickness of each damping structural layer material may be 0.18 um~2.6 um. In some embodiments, the thickness of each damping structural layer material may be 0.2 um~2.5 um. In some embodiments, the thickness of each damping structural layer material may be 0.21 um~2.3 um. In this case, the isotropic structural loss factor of the material of the damping structural layer may be 0.1~2. In some embodiments, the isotropic structural loss factor of the material of the damping structural layer may be 0.2~1.9. In some embodiments, the isotropic structural loss factor of the material of the damping structural layer may be 0.3~1.7. In some embodiments, the isotropic structural loss factor of the material of the damping structural layer may be 0.4~1.5. In some embodiments, the isotropic structural loss factor of the material of the damping structural layer may be 0.5~1.2. In some embodiments, the isotropic structural loss factor of the material of the damping structural layer may be 0.7~1.

Figure 27:
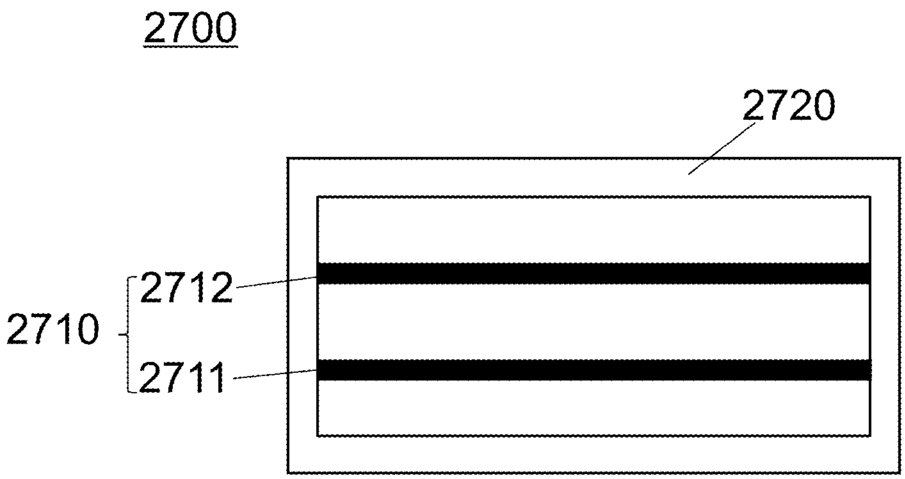
FIG. 27 is a schematic structural diagram of a bone conduction microphone according to some embodiments of the present disclosure.

FIG. 27 is a schematic structural diagram of a capacitive bone conduction microphone according to some embodiments of the present disclosure. As shown in FIG. 27, the bone conduction microphone 2700 may include a base structure 2720 and a capacitance component 2710. The base structure 2720 may be an inner-hollow frame structure, and at least a part of the capacitance component 2710 may be connected to the base structure 2720. It should be noted that the frame structure is not limited to the cuboid shape shown in FIG. 27. In some embodiments, the frame structure may be a regular or irregular structure such as a pyramid, a cylinder, or the like. In some embodiments, the capacitance component 2710 may include at least a first electrode board 2711 and a second electrode board 2712. A non-conductive insulating medium may be filled between the first electrode board 2711 and the second electrode board 2712. The first electrode board 2711 and the second electrode board 2712 may transmit the voltage of the capacitance component 2710 to a processing unit (e.g., a processor) of the bone conduction microphone 2700 through guide wires. In some embodiments, the first electrode board 2711 and the second electrode board 2712 may be structures made of metal materials (e.g., copper, aluminum, etc.). The thickness of the first electrode board 2711 may be smaller than that of the second electrode board 2712 to improve the sensitivity of the capacitance component 2710. In some embodiments, the first electrode board 2711 may also be a non-metallic material structure with a metal layer plated on the surface. For example, the first electrode board 2711 may be a plastic film, and a metal layer may be plated on the surface of the plastic film. In some embodiments, the structures of the first electrode board 2711 and the second electrode board 2712 may be the same or different.

The base structure 2720 may generate vibrations based on an external vibration signal (e.g., muscle vibrations when the user is talking). Units of the capacitance component 2710 (e.g., the first electrode board 2711) may be deformed in response to the vibration of the base structure 2720. The deformation of the first electrode board 2711 may cause the distance between the first electrode board 2711 and the second electrode board 2712 to change. That is, the capacitance of the capacitance component 2710 may change. The total charge of the capacitance component 2710 may be constant. When the capacitance changes, the voltage of the capacitance component 2710 (between the first electrode board 2711 and the second electrode board 2712) may change. The voltage change of the capacitance component 2710 may reflect the strength of the external sound pressure (vibration signal), and the external vibration signal may be converted into an electrical signal through the capacitance component 2710.

In some embodiments, the bone conduction microphone 2700 may further include at least one damping structural layer (not shown in the figure), and at least part of the peripheral side of the damping structural layer may be connected to the base structure 2720. In some embodiments, the area of the damping structural layer may be greater than the area of the upper surface or the lower surface of the capacitance component 2710, so that the damping structural layer may cover the surface of the first electrode board 2711 or the second electrode board 2712, and may also further cover the upper surface and/or the lower surface of the capacitance component 2710. It should be noted that the capacitance component 2710 may replace the laminated structure of the bone conduction microphone (e.g., the bone conduction microphone 300, the bone conduction microphone 900, the bone conduction microphone 1000, the bone conduction microphone 1500, the bone conduction microphone 1600, the bone conduction microphone 2300) mentioned above. In addition, when the capacitance component 2710 replaces the laminated structure of the bone conduction microphone mentioned above, the count of the damping structural layers, the position relative to the base structure, and the parameters (e.g., Young's modulus, thickness, Poisson's ratio, density, etc., of the damping structural layer material) may also be applicable to the bone conduction microphone with the capacitance component 2710, which is not repeated herein.

The basic principles have been described. Obviously, for those skilled in the art, the detailed disclosure is only an example, which does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, some features, structures, or features in the present disclosure of one or more embodiments may be appropriately combined.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be referred to as "data block", "module", "engine", "unit", "component" or "system". In addition, aspects of the present disclosure may appear as a computer product located in one or more computer-readable media, the product including computer-readable program code.

In addition, unless explicitly stated in the claims, the order of processing elements and sequences described in the present disclosure, the use of numbers and letters, or the use of other names are not intended to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the system components described above may be implemented by hardware devices, the system components may also be implemented by software-only solutions. For example, the system as described may be installed on an existing processing device or a mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A bone conduction microphone, comprising:

a laminated structure formed by a vibration unit and an acoustic transducer unit;

a base structure configured to carry the laminated structure, at least one side of the laminated structure being physically connected to the base structure, wherein the base structure vibrates based on an external vibration signal, the vibration unit is deformed in response to the vibration of the base structure, and the acoustic transducer unit generates an electrical signal based on the deformation of the vibration unit, wherein a distance from the acoustic transducer unit to a connection between the laminated structure and the base structure is smaller than a distance from the acoustic transducer unit to a free end of the laminated structure, and an area covered by the acoustic transducer unit on the vibration unit is not greater than ½ of an area of the vibration unit.

2. The bone conduction microphone of claim 1, wherein the area covered by the acoustic transducer unit on the vibration unit is not greater than ¼ of the area of the vibration unit.

3. The bone conduction microphone of claim 1, wherein the bone conduction microphone further includes at least one damping structural layer which is arranged on an upper surface, a lower surface, or an interior of the laminated structure, and the at least one damping structural layer is connected to the base structure.

4. The bone conduction microphone of claim 3, wherein a natural frequency of the laminated structure is located in a voice frequency range, a loss factor of the at least one damping structural layer is in a range of 0.4-100.

5. The bone conduction microphone of claim 4, wherein a Young's modulus of the material of the at least one damping structural layer is in a range of $10^9$ Pa~$10^{10}$ Pa, a density of the material of the at least one damping structural layer is in a range of $1.1\times10^3$ kg/m$^3$~$2\times10^3$ kg/m$^3$, a thickness of the at least one damping structural layer is in a range of 0.1 um~5 um, and the loss factor of the at least one damping structural layer is in a range of 4-20.

6. The bone conduction microphone of claim 4, wherein a Young's modulus of the material of the at least one damping structural layer is in a range of $10^6$ Pa~$10^7$ Pa, a density of the material of the at least one damping structural layer is in a range of $0.7\times10^3$ kg/m$^3$~$1.2\times10^3$ kg/m$^3$, a thickness of the at least one damping structural layer is in a range of 5 um~80 um, and the loss factor of the at least one damping structural layer is in a range of 30-100.

7. The bone conduction microphone of claim 4, wherein a Young's modulus of the material of the at least one damping structural layer is in a range of $10^6$ Pa~$10^7$ Pa, a density of the material of the at least one damping structural layer is in a range of $0.7\times10^3$ kg/m$^3$~$1.2\times10^3$ kg/m$^3$, a thickness of the at least one damping structural layer is in a range of 0.1 um~10 um, and the loss factor of the at least one damping structural layer is set to be in a range of 0.4-1.5.

8. The bone conduction microphone of claim 3, wherein a Poisson's ratio of the material of the at least one damping structural layer is in a range of 0.4~0.5.

9. The bone conduction microphone of claim 3, wherein the base structure includes an inner-hollow frame structure, one end of the laminated structure is connected to the base structure or the at least one damping structural layer, and the other end of the laminated structure is suspended in a hollow position of the base structure.

10. The bone conduction microphone of claim 1, wherein the vibration unit includes a suspended film structure, and the acoustic transducer unit includes a first electrode layer, a piezoelectric layer, and a second electrode layer that are arranged in sequence from top to bottom, wherein the suspended film structure is connected with the base structure through a peripheral side of the suspended film structure, and the acoustic transducer unit is arranged on an upper surface or a lower surface of the suspended film structure.

11. The bone conduction microphone of claim 10, wherein the suspended film structure includes a plurality of holes, and the plurality of holes are arranged along a circumference of the acoustic transducer unit.

12. The bone conduction microphone of claim 10, wherein the vibration unit further includes a mass element, and the mass element is arranged on the upper surface or the lower surface of the suspended film structure.

13. The bone conduction microphone of claim 12, wherein the acoustic transducer unit and the mass element are arranged on different sides of the suspended film structure, respectively; or the acoustic transducer unit and the mass element are arranged on the same side of the suspended film structure, wherein the acoustic transducer unit is a ring-shaped structure, the ring-shaped structure is arranged along a circumference of the mass element.

14. The bone conduction microphone of claim 1, wherein the vibration unit includes at least one support arm and a mass element, and the mass element is connected to the base structure via the at least one support arm.

15. The bone conduction microphone of claim 14, wherein the acoustic transducer unit is arranged on an upper surface, a lower surface, or an interior of the at least one support arm.

16. The bone conduction microphone of claim 15, wherein the acoustic transducer unit includes a first electrode layer, a piezoelectric layer, and a second electrode layer that are arranged in sequence from top to bottom, and the first electrode layer or the second electrode layer is connected to the upper surface or the lower surface of the at least one support arm.

17. The bone conduction microphone of claim 16, wherein the mass element is arranged on an upper surface or a lower surface of the first electrode layer or the second electrode layer.

18. The bone conduction microphone of claim 17, wherein an area of the first electrode layer, the piezoelectric layer, and/or the second electrode layer is not greater than an area of the support arm, and part or all of the first electrode layer, the piezoelectric layer, and/or the second electrode layer cover the upper surface or the lower surface of the at least one support arm.

19. The bone conduction microphone of claim 18, wherein the first electrode layer, the piezoelectric layer, and the second electrode layer of the acoustic transducer unit are close to a connection between the mass element or/and the support arm and the base structure.

20. The bone conduction microphone of claim 16, wherein the at least one support arm includes at least one elastic layer, and the at least one elastic layer is arranged on an upper surface or a lower surface of a first electrode layer or a second electrode layer.

* * * * *